US012453744B1

(12) United States Patent
Markoutsa et al.

(10) Patent No.: US 12,453,744 B1
(45) Date of Patent: Oct. 28, 2025

(54) EXOSOMES ISOLATED FROM MESENCHYMAL STEM CELLS AND USES THEREOF

(71) Applicant: University of South Florida, Tampa, FL (US)

(72) Inventors: Eleni Markoutsa, Tampa, FL (US); Shyam S. Mohapatra, Lutz, FL (US); Subhra Mohapatra, Lutz, FL (US)

(73) Assignee: University of South Florida, Tampa, FL (US)

( * ) Notice: Subject to any disclaimer, the term of this patent is extended or adjusted under 35 U.S.C. 154(b) by 161 days.

(21) Appl. No.: 17/119,318

(22) Filed: Dec. 11, 2020

Related U.S. Application Data

(60) Provisional application No. 62/947,710, filed on Dec. 13, 2019.

(51) Int. Cl.
| | |
|---|---|
| *A61K 35/28* | (2015.01) |
| *A61K 31/203* | (2006.01) |
| *A61K 31/7088* | (2006.01) |
| *C12N 5/0775* | (2010.01) |
| *C12N 15/113* | (2010.01) |

(52) U.S. Cl.
CPC ............ *A61K 35/28* (2013.01); *A61K 31/203* (2013.01); *A61K 31/7088* (2013.01); *C12N 5/0662* (2013.01); *C12N 15/113* (2013.01); *C12N 2310/113* (2013.01); *C12N 2502/086* (2013.01)

(58) Field of Classification Search
CPC .... A61K 35/28; A61K 31/203; C12N 15/113; C12N 2310/113; C12N 2502/086
See application file for complete search history.

(56) References Cited

U.S. PATENT DOCUMENTS

| | | | |
|---|---|---|---|
| 2006/0008902 A1 | | 1/2006 | Pike et al. |
| 2019/0269739 A1* | | 9/2019 | Brodie .................... A61P 35/00 |

OTHER PUBLICATIONS

Liang et al (Mesenchymal Stem Cell-Derived Exosomal MiRNAs Promote M2 Macrophages Polarization: Therapeutic Opportunities for Spinal Cord Injury. Frontiers in Mol Neuro, vol. 15, Jul. 2022) (Year: 2022).*
Song et al (Exosomal miR-146a Contributes to the Enhanced Therapeutic Efficacy of Interleukin-1-Primed Mesenchymal Stem Cells Against Sepsis. Stem Cells, vol. 35, Jan. 2017) (Year: 2017).*
Neha et al (Animal models of dementia and cognitive dysfunction. Life Sciences, vol. 109, Jun. 2014) (Year: 2014).*
Lai et al (Dynamic Biodistribution of Extracellular Vesicles in Vivo Using a Multimodal Imaging Reporter. ACS Nano, vol. 8, Jan. 2014) (Year: 2014).*
Catorce et al (LPS-induced Murine Neuroinflammation Model: Main Features and Suitability for Pre-clinical Assessment of Nutraceuticals. Current Neuropharmacology, vol. 14, 2016) (Year: 2016).*
Jankowsky et al (Practical considerations for choosing a mouse model of Alzheimer's disease. Mol Neurodeg, vol. 12, Dec. 2017) (Year: 2017).*
Guo et al (Mesenchymal stem cell-derived exosome: a promising alternative in the therapy of Alzheimer's disease. Alz Res & Therapy, vol. 12, Sep. 2020) (Year: 2020).*
Infographic "NIA: Understanding different types of dementia" (Year: 2023).*
Markoutsa et al (Extracellular vesicles derived from inflammatory-educated stem cells reverse brain inflammation—implication of miRNAs, Molecular Therapy vol. 30 No. 2 Feb. 2022 (Year: 2022).*
Huo et al (Dexamethasone inhibits the Nox-dependent ROS production via suppression of MKP-1-dependent MAPK pathways in activated microglia. BMC Neuroscience 2011, 12:49 (Year: 2011).*
Cui et al (Exosomes derived from hypoxia-preconditioned mesenchymal stromal cells ameliorate cognitive decline by rescuing synaptic dysfunction and regulating inflammatory responses in APP/PS1 mice. The FASEB, vol. 32, Feb. 2018) (Year: 2018).*
Moraes et al (Activated Microglia-Induced Deficits in Excitatory Synapses Through IL-1ß: Implications for Cognitive Impairment in Sepsis. Mol Neurobiol (2015) 52:653-663 (Year: 2015).*
Phinney et al (Concise Review: MSC-Derived Exosomes for Cell-Free Therapy. Stem Cells, vol. 35, Mar. 2017) (Year: 2017).*
Elia et al (Extracellular Vesicles from Mesenchymal Stem Cells Exert Pleiotropic Effects on Amyloid-ß, Inflammation, and Regeneration: A Spark of Hope for Alzheimer's Disease from Tiny Structures? BioEssays 2019, 41 (Year: 2019).*
Ruppert et al (Human Mesenchymal Stromal Cell-Derived Extracellular Vesicles Modify Microglial Response and Improve Clinical Outcomes in Experimental Spinal Cord Injury. Sci Rep, (2018) 8:480) (Year: 2018).*
CD8 antibodies by Novus Biologicals (Year: 2023).*
System Biosciences Product Brochure on Exosome research (Year: 2023).*
Das et al (Potential therapeutic roles of retinoids for prevention of neuroinflammation and neurodegeneration in Alzheimer's disease , Neural Regen Res 14(11):1880-1892, Mar. 2019 (Year: 2019).*
Luan et al (Engineering exosomes as refined biological nanoplatforms for drug delivery. Acta Pharmacologica Sinica (2017) 38: 754-763 (Year: 2017).*
BM-MSC cell line (ATCC, PCS-500-012; available since at least 2016; see References using this commercial product (Year: 2016).*
Altschul, Stephen F., et al. Basic local alignment search tool. Journal of molecular biology 215.3 (1990): 403-410.
Altschul, Stephen F., et al. Gapped BLAST and PSI-BLAST: a new generation of protein database search programs. Nucleic acids research 25.17 (1997): 3389-3402.

(Continued)

*Primary Examiner* — Emily A Cordas
*Assistant Examiner* — Matasha Dhar
(74) *Attorney, Agent, or Firm* — Meunier Carlin & Curfman LLC

(57) ABSTRACT

The present disclosure relates to exosomes isolated from mesenchymal stem cells exposed to a conditioned media in which microglial cells are cultured in the presence of lipopolysaccharide (LPS) or a beta-amyloid oligomer and uses thereof for reducing inflammation and for treating Alzheimer's disease.

5 Claims, 12 Drawing Sheets

Specification includes a Sequence Listing.

(56) References Cited

OTHER PUBLICATIONS

Alvarez-Erviti, L., et al., Delivery of siRNA to the mouse brain by systemic injection of targeted exosomes. Nat Biotechnol, 2011. 29(4): p. 341-5.
Balducci, C., et al., Toll-like receptor 4-dependent glial cell activation mediates the impairment in memory establishment induced by beta-amyloid oligomers in an acute mouse model of Alzheimer's disease. Brain Behav Immun, 2017. 60: p. 188-197.
Beaucage, S. L., and M. H. Caruthers. Deoxynucleoside phosphoramidites—a new class of key intermediates for deoxypolynucleotide synthesis. Tetrahedron letters 22.20 (1981): 1859-1862.
Busquets, O., et al., JNK1 inhibition by Licochalcone A leads to neuronal protection against excitotoxic insults derived of kainic acid. Neuropharmacology, 2018. 131: p. 440-452.
Chen, S., et al., TLR4 signaling pathway mediates the LPS/ischemia-induced expression of monocytechemotactic protein-induced protein 1 in microglia. Neurosci Lett, 2018. 686: p. 33-40.
Chen, X., et al., The Nephroprotective Effect of TNF Receptor-Associated Factor 6 (TRAF6) Blockade on LPS-Induced Acute Renal Injury Through the Inhibition if Inflammation and Oxidative Stress. Med Sci Monit, 2020. 26: p. e919698.
Cherry, J.D., J.A. Olschowka, and M.K. O'Banion, Neuroinflammation and M2 microglia: the good, the bad, and the inflamed. J Neuroinflammation, 2014. 11: p. 98.
Crop, M.J., et al., Inflammatory conditions affect gene expression and function of human adipose tissue-derived mesenchymal stem cells. Clin Exp Immunol, 2010. 162(3): p. 474-86.
Dansokho, C. and M.T. Heneka, Neuroinflammatory responses in Alzheimer's disease. J Neural Transm (Vienna), 2018. 125(5): p. 771-779.
Ding, Y.H., et al., Isoalantolactone suppresses LPS-induced inflammation by inhibiting TRAF6 ubiquitination and alleviates acute lung injury. Acta Pharmacol Sin, 2019. 40(1): p. 64-74.
Dionisio-Santos, D.A., J.A. Olschowka, and M.K. O'Banion, Exploiting microglial and peripheral immune cell crosstalk to treat Alzheimer's disease. J Neuroinflammation, 2019. 16(1): p. 74.
Doeppner, T.R., et al., Extracellular Vesicles Improve Post-Stroke Neuroregeneration and Prevent Postischemic Immunosuppression. Stem Cells Transl Med, 2015. 4(10): p. 1131-43.
Domenis, R., et al., Pro inflammatory stimuli enhance the immunosuppressive functions of adipose mesenchymal stem cells-derived exosomes. Sci Rep, 2018. 8(1): p. 13325.
Doring, C., et al., A presumed antagonistic LPS identifies distinct functional organization of TLR4 in mouse microglia. Glia, 2017. 65(7): p. 1176-1185.
Fan, B., et al., Pycnogenol Attenuates the Release of Proinflammatory Cytokines and Expression of Perilipin 2 in Lipopolysaccharide-Stimulated Microglia in Part via Inhibition of NF-kappaB and AP-1 Activation. PLoS One, 2015. 10(9): p. e0137837.
Fiebich, B.L., et al., Role of Microglia TLRs in Neurodegeneration. Front Cell Neurosci, 2018. 12: p. 329.
Forloni, G. and C. Balducci, Alzheimer's Disease, Oligomers, and Inflammation. J Alzheimers Dis, 2018. 62(3): p. 1261-1276.
Gabuzda, D. and B.A. Yankner, Inflammation links ageing to the brain. Nature, 2013. 497(7448): p. 197-8.
Guo, S., et al., Intranasal Delivery of Mesenchymal Stem Cell Derived Exosomes Loaded with Phosphatase and Tensin Homolog siRNA Repairs Complete Spinal Cord Injury. ACS Nano, 2019.
Ha, D., N. Yang, and V. Nadithe, Exosomes as therapeutic drug carriers and delivery vehicles across biological membranes: current perspectives and future challenges. Acta Pharm Sin B, 2016. 6(4): p. 287-96.
Heneka, M.T., R.M. McManus, and E. Latz, Inflammasome signalling in brain function and neurodegenerative disease. Nat Rev Neurosci, 2018. 19(10): p. 610-621.
Henikoff, Steven, and Jorja G. Henikoff. Amino acid substitution matrices from protein blocks. Proceedings of the National Academy of Sciences 89.22 (1992): 10915-10919.

Heurtaux, T., et al., Microglial activation depends on beta-amyloid conformation: role of the formylpeptide receptor 2. J Neurochem, 2010. 114(2): p. 576-86.
Hsieh, J.Y., et al., Mesenchymal stem cells from human umbilical cord express preferentially secreted factors related to neuroprotection, neurogenesis, and angiogenesis. PLoS One, 2013. 8(8): p. e72604.
Karlin, Samuel, and Stephen F. Altschul. Applications and statistics for multiple high-scoring segments in molecular sequences. Proceedings of the National Academy of Sciences 90.12 (1993): 5873-5877.
Katakowski, M., et al., Exosomes from marrow stromal cells expressing miR-146b inhibit glioma growth. Cancer Lett, 2013. 335(1): p. 201-4.
Kizil, C., N. Kyritsis, and M. Brand, Effects of inflammation on stem cells: together they strive? EMBO Rep, 2015. 16(4): p. 416-26.
Koh, W., et al., Analysis of deep sequencing microRNA expression profile from human embryonic stem cells derived mesenchymal stem cells reveals possible role of let-7 microRNA family in downstream targeting of hepatic nuclear factor 4 alpha. BMC Genomics, 2010. 11 Suppl 1: p. S6.
Kowalski, K. and A. Mulak, Brain-Gut-Microbiota Axis in Alzheimer's Disease. J Neurogastroenterol Motil, 2019. 25(1): p. 48-60.
Liu, Q., et al., MCP-1 Priming Enhanced the Therapeutic Effects of Mesenchymal Stromal Cells on Contact Hypersensitivity by Activating the COX2-PGE2/STAT3 Pathway. Stem Cells Dev, 2020.
Lou, G., et al., Mesenchymal stem cell-derived exosomes as a new therapeutic strategy for liver diseases. Exp Mol Med, 2017. 49(6): p. e346.
Matteucci, Mark Douglas, and M. Ho Caruthers. Synthesis of deoxyoligonucleotides on a polymer support. Journal of the American Chemical Society 103.11 (1981): 3185-3191.
Meda, L., et al., Activation of microglial cells by beta-amyloid protein and interferon-gamma. Nature, 1995. 374(6523): p. 647-50.
Morris, R., Developments of a water-maze procedure for studying spatial learning in the rat. J Neurosci Methods, 1984. 11(1): p. 47-60.
Nakano, M., et al., Bone marrow-derived mesenchymal stem cells improve cognitive impairment in an Alzheimer's disease model by increasing the expression of microRNA-146a in hippocampus. Sci Rep, 2020. 10(1): p. 10772.
Pan, Z., et al., Epigenetic modification of spinal miR-219 expression regulates chronic inflammation pain by targeting CaMKIIgamma. J Neurosci, 2014. 34(29): p. 9476-83.
Petrov, D., et al., Evaluation of the Role of JNK1 in the Hippocampus in an Experimental Model of Familial Alzheimer's Disease. Mol Neurobiol, 2016. 53(9): p. 6183-6193.
Phinney, D.G. and D.J. Prockop, Concise review: mesenchymal stem/multipotent stromal cells: the state of transdifferentiation and modes of tissue repair—current views. Stem Cells, 2007. 25(11): p. 2896-902.
Prendergast, E.N., et al., Optimizing exosomal RNA isolation for RNA-Seq analyses of archival sera specimens. PLoS One, 2018. 13(5): p. e0196913.
Qiang, W., et al., Artemisinin B Improves Learning and Memory Impairment in AD Dementia Mice by Suppressing Neuroinflammation. Neuroscience, 2018. 395: p. 1-12.
Qin, L., et al., Interactive role of the toll-like receptor 4 and reactive oxygen species in LPS-induced microglia activation. Glia, 2005. 52(1): p. 78-84.
Rodriguez, L.A., 2nd, et al., hypoxia with or without inflammatory mediators to potentiate their immunotherapeutic function. Cells, 2019. 8(5).
Ruppert, K.A., et al., Human Mesenchymal Stromal Cell-Derived Extracellular Vesicles Modify Microglial Response and Improve Clinical Outcomes in Experimental Spinal Cord Injury. Sci Rep, 2018. 8(1): p. 480.
Salminen, A., et al., Amyloid-beta oligomers set fire to inflammasomes and induce Alzheimer's pathology. J Cell Mol Med, 2008. 12(6A): p. 2255-62.
Salminen, A., et al., Inflammation in Alzheimer's disease: amyloid-beta oligomers trigger innate immunity defence via pattern recognition receptors. Prog Neurobiol, 2009. 87(3): p. 181-94.

(56) References Cited

OTHER PUBLICATIONS

Santa-Maria, I., et al., Dysregulation of microRNA-219 promotes neurodegeneration through post-transcriptional regulation of tau. J Clin Invest, 2015. 125(2): p. 681-6.
Sarlus, H. and M.T. Heneka, Microglia in Alzheimer's disease. J Clin Invest, 2017. 127(9): p. 3240-3249.
Seibenhener, M.L. and M.C. Wooten, Use of the Open Field Maze to measure locomotor and anxiety-like behavior in mice. J Vis Exp, 2015(96): p. e52434.
Sondag, C.M., G. Dhawan, and C.K. Combs, Beta amyloid oligomers and fibrils stimulate differential activation of primary microglia. J Neuroinflammation, 2009. 6: p. 1.
Song, S., et al., Noradrenergic dysfunction accelerates LPS-elicited inflammation- related ascending sequential neurodegeneration and deficits in non-motor/motor functions. Brain Behav Immun, 2019. 81: p. 374-387.
Stine, W.B., et al., Preparing synthetic Abeta in different aggregation states. Methods Mol Biol, 2011. 670: p. 13-32.
Stine, W.B., Jr., et al., In vitro characterization of conditions for amyloid-beta peptide oligomerization and fibrillogenesis. J Biol Chem, 2003. 278(13): p. 11612-22.
Sun, J. and G. Nan, The extracellular signal-regulated kinase 1/2 pathway in neurological diseases: A potential therapeutic target (Review). Int J Mol Med, 2017. 39(6): p. 1338-1346.
Thomi, G., et al., Exosomes derived from umbilical cord mesenchymal stem cells reduce microglia-mediated neuroinflammation in perinatal brain injury. Stem Cell Res Ther, 2019. 10(1): p. 105.
Thomi, G., et al., Intranasally Administered Exosomes from Umbilical Cord Stem Cells Have Preventive Neuroprotective Effects and Contribute to Functional Recovery after Perinatal Brain Injury. Cells, 2019. 8(8).
Ti, D., et al., LPS-preconditioned mesenchymal stromal cells modify macrophage polarization for resolution of chronic inflammation via exosome-shuttled let-7b. J Transl Med, 2015. 13: p. 308.
Trivedi P & Hematti P, Simultaneous generation of CD34+ primitive hematopoietic cells and CD56+ mesenchymal stem 25 cells from human embryonic stem cells cocultured with murine OP9 stromal cells. Exp. Hematol. 35.1, (2007):146-154.
Trivedi, Parul, and Peiman Hematti. Derivation and immunological characterization of mesenchymal stromal cells from human embryonic stem cells. Experimental hematology 36.3 (2008): 350-359.
Vargas-Caraveo, A., et al., Lipopolysaccharide enters the rat brain by a lipoprotein-mediated transport mechanism in physiological conditions. Sci Rep, 2017. 7(1): p. 13113.
Villarroya-Beltri, C., et al., Sorting it out: regulation of exosome loading. Semin Cancer Biol, 2014. 28: p. 3-13.
Waetzig, V., et al., c-Jun N-terminal kinases (JNKs) mediate pro-inflammatory actions of microglia. Glia, 2005. 50(3): p. 235-46.
Wang, H., et al., Curcumin-primed exosomes potently ameliorate cognitive function in AD mice by inhibiting hyperphosphorylation of the Tau protein through the AKT/GSK-3beta pathway. Nanoscale, 2019. 11(15): p. 7481-7496.
Wang, L.M., et al., Lipopolysaccharide endotoxemia induces amyloid-beta and p-tau formation in the rat brain. Am J Nucl Med Mol Imaging, 2018. 8(2): p. 86-99.
Wang, W.Y., et al., Role of pro-inflammatory cytokines released from microglia in Alzheimer's disease. Ann Transl Med, 2015. 3(10): p. 136.
Wang, Z.Q., et al., Inhibition of MEK/ERK 1/2 pathway reduces pro-inflammatory cytokine interleukin-1 expression in focal cerebral ischemia. Brain Res, 2004. 996(1): p. 55-66.
Wen, L., et al., The m6A methyltransferase METTL3 promotes LPS-induced microglia inflammation through TRAF6/NF-kappaB pathway. Neuroreport, 2020, 9 pages.
Xie, M.Y., et al., Porcine Milk Exosome MiRNAs Attenuate LPS-Induced Apoptosis through Inhibiting TLR4/NF-kappaB and p53 Pathways in Intestinal Epithelial Cells. J Agric Food Chem, 2019. 67(34): p. 9477-9491.
Xin, H., et al., Exosome-mediated transfer of miR-133b from multipotent mesenchymal stromal cells to neural cells contributes to neurite outgrowth. Stem Cells, 2012. 30(7): p. 1556-64.
Yao, L., et al., Toll-like receptor 4 mediates microglial activation and production of inflammatory mediators in neonatal rat brain following hypoxia: role of TLR4 in hypoxic microglia. J Neuroinflammation, 2013. 10: p. 23.
Yao, Y., et al., Lipopolysaccharide preconditioning enhances the efficacy of mesenchymal stem cells transplantation in a rat model of acute myocardial infarction. J Biomed Sci, 2009. 16: p. 74.
Yeo, R.W., et al., Mesenchymal stem cell: an efficient mass producer of exosomes for drug delivery. Adv Drug Deliv Rev, 2013. 65(3): p. 336-41.
Zhan, X., B. Stamova, and F.R. Sharp, Lipopolysaccharide Associates with Amyloid Plaques, Neurons and Oligodendrocytes in Alzheimer's Disease Brain: A Review. Front Aging Neurosci, 2018. 10: p. 42.
Zhao, J., et al., Neuroinflammation induced by lipopolysaccharide causes cognitive impairment in mice. Sci Rep, 2019. 9(1): p. 5790.
Zhu, X., et al., The role of mitogen-activated protein kinase pathways in Alzheimer's disease. Neurosignals, 2002. 11(5): p. 270-81.
Zhu, Y., et al., MiR-219-5p promotes spinal cord injury recovery by inhibiting NEUROD2-regulated inflammation and oxidative stress. Eur Rev Med Pharmacol Sci, 2019. 23(1): p. 37-43.
Zhuang, X., et al., Treatment of brain inflammatory diseases by delivering exosome encapsulated anti-inflammatory drugs from the nasal region to the brain. Mol Ther, 2011. 19(10): p. 1769-79.

* cited by examiner

EXOSOMES ISOLATED FROM MESENCHYMAL STEM CELLS AND USES THEREOF

CROSS-REFERENCE TO RELATED APPLICATIONS

This application claims the benefit of U.S. Provisional Application No. 62/947,710, filed Dec. 13, 2019, which is expressly incorporated herein by reference.

FIELD

The present disclosure relates to exosomes isolated from mesenchymal stem cells and uses thereof for reducing inflammation and for treating Alzheimer's disease.

BACKGROUND

Neuroinflammation is the main cause for many brain diseases, including Alzheimer's Disease (AD). Alzheimer's disease is the sixth leading cause of death in the United States and the only disease in the ten leading causes of deaths in the United States without a cure. It is estimated that 5.5 million Americans age 65 and older have AD and treatment remains a challenge as FDA approved drugs treat only symptoms and not the underlying destruction of nerve cells. Studies on AD treatments have been mainly focused on dissolving or preventing formation of senile plaques and tangles, but recent studies have shown that there is no direct correlation between the existence of the plaques and neuronal loss. On the contrary, the levels of soluble beta-amyloid oligomers directly correlate with cognitive impairment. Therefore, what is needed are novel compositions and methods for reducing inflammation and for preventing and treating Alzheimer's Disease (AD). The compositions and methods disclosed herein address these and other needs.

SUMMARY

Disclosed herein are exosomes isolated from mesenchymal stem cells and uses thereof for reducing inflammation and/or treating Alzheimer's disease.

In some aspects, disclosed herein is an exosome isolated from a mesenchymal stem cell, wherein the mesenchymal stem cell is exposed to a conditioned media in which microglial cells are cultured in the presence of lipopolysaccharide (LPS) or a beta-amyloid oligomer.

In some embodiments, the exosome comprises a protein selected form the group consisting of CD81, CD9, and CD63.

In some embodiments, the mesenchymal stem cell is selected from the group consisting of a primary human mesenchymal stem cell and a mesenchymal stem cell line.

In some embodiments, the exosome further comprises a therapeutic agent. In some embodiments, the therapeutic agent is retinoic acid. In some embodiments, the therapeutic agent is an anti-inflammatory agent.

In some embodiments, the therapeutic agent comprises one or more antagomirs targeting an upregulated miRNA. In some embodiments, the upregulated miRNA is selected from the group consisting of miRNA-219a-2-3, miR-10527, miR-329, and miR-578.

In some aspects, disclosed herein is a method of reducing inflammation in a subject, comprising administering to the subject a therapeutically effective amount of an exosome isolated from a mesenchymal stem cell, wherein the mesenchymal stem cell is exposed to a conditioned media in which microglial cells are cultured in the presence of lipopolysaccharide (LPS) or a beta-amyloid oligomer.

In some embodiments, the exosome comprises a protein selected from the group consisting of CD81, CD9, and CD63.

In some embodiments, the mesenchymal stem cell is selected from the group consisting of a primary human mesenchymal stem cell and a mesenchymal stem cell line. In some embodiments, the exosome further comprises a therapeutic agent. In some embodiments, the therapeutic agent is retinoic acid.

In some aspects, disclosed herein is a method of treating Alzheimer's disease in a subject, comprising administering to the subject a therapeutically effective amount of an exosome isolated from a mesenchymal stem cell, wherein the mesenchymal stem cell is exposed to a conditioned media in which microglial cells are cultured in the presence of lipopolysaccharide (LPS) or a beta-amyloid oligomer.

In some embodiments, the exosome is administered to the subject via an intranasal administration.

In some embodiments, the exosome decreases microglial cell activation. In some embodiments, the exosome decreases production of an inflammatory mediator from a microglial cell. In some embodiments, the exosomes further comprises one or more microRNAs and/or their antagomirs.

BRIEF DESCRIPTION OF THE DRAWINGS

The accompanying figures, which are incorporated in and constitute a part of this specification, illustrate several aspects described below.

FIG. 1A shows TNFα, IL-6 and IL-1β expression.

FIG. 1B shows ROS production and FIG. 1C shows Iba1 expression of LPS-activated microglia cells treated with total secretome, soluble fraction or exosome fraction. Total secretome was collected from hMSCs provided by Lonza or Texas A&M. (scale bar 50 um). *P<0.05; P<0.05; *P<0.05; #P<0.05; ##P<0.05 one-way ANOVA, data are mean±SD. * corresponds to significant differences with LPS group, # corresponds to significant differences with soluble group.

FIG. 2A shows experimental design for edu-MSC exosome collection. FIG. 2B shows size distribution of edu-MSC exosomes. FIG. 2C shows size a TEM image of edu-MSC exosomes.

FIG. 3A shows the size distribution of MSC-exosomes. FIG. 3B shows a TEM image of the exosomes.

FIG. 4A shows gene expression of pro-inflammatory cytokines, FIG. 4B shows expression of microglia marker Iba-1 and FIG. 4C shows quantitative analysis for Iba-1 Intensity on HMC3 cells co-treated with LPS and exosomes for 72 hours. *P<0.05; P<0.05; *P<0.05; *P<0.05; ##P<0.05 one-way ANOVA, data are presented as the mean±SD of three biological replicates. * corresponds to significant differences with LPS group, # corresponds to significant differences MSC-exo.

FIG. 5A shows TEM Imaging of Aβ Oligomers (AβOs), protofibrils and fibrils formation. FIG. 5B shows experimental design for edu-MSC exosome collection. FIG. 5C shows IL-6, IL-1β and TNF-α gene expression (qRT-PCR). FIG. 5D shows IL-6, IL-1β and TNF-α protein expression (antibody array). FIG. 5E shows Iba-1 staining and FIG. 5F shows ROS production of AβO-induced microglia cells treated with MSC exosomes or edu-MSC exosomes. Scale bar E&F: 50 µm. *P<0.05; P<0.05; *P<0.05; #P<0.05 one-way ANOVA, data are mean±SD. * corresponds to significant differences with AβO group, # corresponds to significant differences MSC-exo group.

FIG. 6A shows representative biofluorescence image, FIG. 6B shows representative images of explanted brain and lung and FIG. 6C shows brain and lung fluorescence signal quantification of mice administered exosomes intranasal, 60 minutes post-administration.

FIG. 7A shows representative ex vivo fluorescent image and FIG. 7B shows Iba1 immuno-histochemistry analysis of brain sections.

FIG. 9A shows expression of proinflammatory cytokines IL-1β, IL-6 and TNF-α, FIG. 9B shows representative images of thioflavin S staining of beta amyloid plaques and FIG. 9C shows myelin basic protein (MBP) staining in the brain of mice administered with PBS, MSC exo or edu-MSC exo for three days. Scale bar 200 µm (n=10). *P<0.05; P<0.05; *P<0.05; #P<0.05; ##P<0.01; ###P<0.001; one-way ANOVA, data are mean±SEM. * corresponds to significant differences with LPS group, # corresponds to significant differences MSC-exo group.

FIG. 10A shows IL-6 and IL-1ß gene expression. FIG. 10B shows nitrite release. FIG. 10C shows microglia morphology. FIG. 10D shows ROS production.

FIG. 12A shows Scatter Plot of Differentially Expressed miRNAs between MSC exosomes and edu-MSC exosomes (education: LPS priming of microglia cells). The values of X and Y axes in the Scatterplot are the averaged CPM values of each group (log 2 scaled). FIG. 12B shows Hierarchical Clustering of Differentially Expressed miRNAs. The heatmap were performed using significant differentially expressed miRNAs fold>1.5. FIG. 12C shows top 17 up-regulated miRNAs of the edu-MSC exosomes (priming of microglia with LPS) with a fold change more than 100. FIG. 12D shows upregulation of mir-219, mir-10527 and miR-329 on edu-MSC exosomes (priming of microglia with Abo). FIG. 12E shows the bar plot shows the top ten Enrichment Score value of the significant enrichment terms, Biological Process.

DETAILED DESCRIPTION

Figures 1A, 1B, 1C:
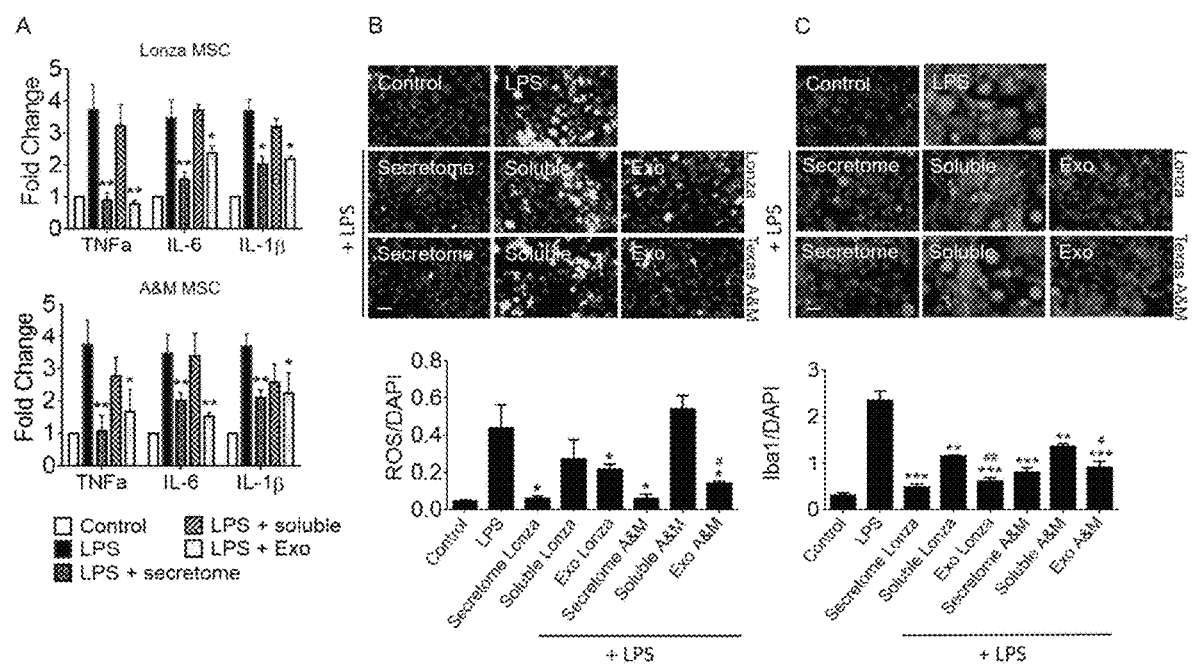
FIGS. 1A-1C show the effect of the MSC total secretome, soluble fraction and exosome fraction on LPS-induced microglia activation.

The present disclosure provides exosomes isolated from mesenchymal stem cells that are challenged in an environment related to neuroinflammation [lipopolysaccharide (LPS) or beta-amyloid oligomer (Aβ oligomers or ABO)]. These mesenchymal stem cells release exosomes with improved anti-inflammatory capabilities. These "induced" exosomes are able to fight the specific cause of inflammation for neuroinflammation related diseases. Based on the data shown herein, exosomes isolated from stem cells exposed to LPS-related inflammation or AD-related inflammatory conditions can effectively reduce inflammation. These "induced" exosomes are also used in the treatment of Alzheimer's disease (AD). These exosomes can also be modified to stop further production of toxic peptides. In some embodiments, retinoic acid is incorporated into the stem cell-derived exosomes as a way to stop further accumulation of toxic peptides. This approach is also used for treatment of other neurological conditions where neuroinflammation is prevalent, such as Parkinson's Disease, Multiple Sclerosis, Huntington's and Traumatic Brain Injury.

These biocompatible and biodegradable cell-derived exosome nanoparticles described herein are effective in delivering hydrophobic drugs and small molecules and they can replace synthetic polymeric nanoparticles. In addition, the compositions shown herein are focused on treating the underlying destruction of nerve cells in AD and other neurodegenerative diseases and not just the symptoms of disease.

Therefore, disclosed herein are exosomes isolated from mesenchymal stem cells and uses thereof for reducing inflammation and for treating Alzheimer's disease.

Reference will now be made in detail to the embodiments of the invention, examples of which are illustrated in the drawings and the examples. This invention may, however, be embodied in many different forms and should not be construed as limited to the embodiments set forth herein.

Unless defined otherwise, all technical and scientific terms used herein have the same meaning as commonly understood to one of ordinary skill in the art to which this disclosure belongs.

Terminology

Terms used throughout this application are to be construed with ordinary and typical meaning to those of ordinary skill in the art. However, Applicant desires that the following terms be given the particular definition as defined below.

As used herein, the article "a," "an," and "the" means "at least one," unless the context in which the article is used clearly indicates otherwise.

The term "comprising" and variations thereof as used herein is used synonymously with the term "including" and variations thereof and are open, non-limiting terms.

Although the terms "comprising" and "including" have been used herein to describe various embodiments, the terms "consisting essentially of" and "consisting of" can be used in place of "comprising" and "including" to provide for more specific embodiments and are also disclosed.

As used herein, the terms "may," "optionally," and "may optionally" are used interchangeably and are meant to include cases in which the condition occurs as well as cases in which the condition does not occur. Thus, for example, the statement that a formulation "may include an excipient" is meant to include cases in which the formulation includes an excipient as well as cases in which the formulation does not include an excipient.

The terms "about" and "approximately" are defined as being "'close to" as understood by one of ordinary skill in the art. In one non-limiting embodiment, the terms are defined to be within 10%. In another non-limiting embodiment, the terms are defined to be within 5%. In still another non-limiting embodiment, the terms are defined to be within 1%.

A "composition" is intended to include a combination of active agent and another compound or composition, inert (for example, a detectable agent or label) or active.

As used herein, the term "effective amount" refers to an amount of a composition (e.g., an exosome) necessary or sufficient to realize a desired biologic effect. An effective amount of the composition would be the amount that achieves a selected result, and such an amount could be determined as a matter of routine experimentation by a person skilled in the art. For example, an effective amount of the composition could be that amount necessary for preventing, treating and/or ameliorating systemic or tissue-localized inflammation in a subject, or that amount necessary for preventing, treating and/or ameliorating Alzheimer's disease in a subject. The term is also synonymous with "sufficient amount."

The term "subject" is defined herein to include animals such as mammals, including, but not limited to, primates (e.g., humans), cows, sheep, goats, horses, dogs, cats, rabbits, rats, mice and the like. In some embodiments, the subject is a human.

"Pharmaceutically acceptable carrier" (sometimes referred to as a "carrier") means a carrier or excipient that is useful in preparing a pharmaceutical or therapeutic composition that is generally safe and non-toxic, and includes a carrier that is acceptable for veterinary and/or human pharmaceutical or therapeutic use. The terms "carrier" or "pharmaceutically acceptable carrier" can include, but are not limited to, phosphate buffered saline solution, water, emulsions (such as an oil/water or water/oil emulsion) and/or various types of wetting agents.

As used herein, the term "carrier" encompasses any excipient, diluent, filler, salt, buffer, stabilizer, solubilizer, lipid, stabilizer, or other material well known in the art for use in pharmaceutical formulations. The choice of a carrier for use in a composition will depend upon the intended route of administration for the composition. The preparation of pharmaceutically acceptable carriers and formulations containing these materials is described in, e.g., *Remington's Pharmaceutical Sciences*, 21st Edition, ed. University of the Sciences in Philadelphia, Lippincott, Williams & Wilkins, Philadelphia, PA, 2005. Examples of physiologically acceptable carriers include saline, glycerol, DMSO, buffers such as phosphate buffers, citrate buffer, and buffers with other organic acids; antioxidants including ascorbic acid; low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, arginine or lysine; monosaccharides, disaccharides, and other carbohydrates including glucose, mannose, or dextrins; chelating agents such as EDTA; sugar alcohols such as mannitol or sorbitol; salt-forming counterions such as sodium; and/or nonionic surfactants such as TWEEN™ (ICI, Inc.; Bridgewater, New Jersey), polyethylene glycol (PEG), and PLURONICS™ (BASF; Florham Park, NJ). To provide for the administration of such dosages for the desired therapeutic treatment, compositions disclosed herein can advantageously comprise between about 0.1% and 99% by weight of the total of one or more of the subject compounds based on the weight of the total composition including carrier or diluent.

As used herein, the terms "treating" or "treatment" of a subject includes the administration of a drug to a subject with the purpose of curing, healing, alleviating, relieving, altering, remedying, ameliorating, improving, stabilizing or affecting a disease or disorder, or a symptom of a disease or disorder. The terms "treating" and "treatment" can also refer to reduction in severity and/or frequency of symptoms, elimination of symptoms and/or underlying cause, and improvement or remediation of damage.

"Therapeutically effective amount" or "therapeutically effective dose" of a composition (e.g. an exosome isolated from a mesenchymal stem cell) refers to an amount that is effective to achieve a desired therapeutic result. In some embodiments, a desired therapeutic result is the prevention of Alzheimer's disease, a systemic and/or tissue localized inflammation. In some embodiments, a desired therapeutic result is the treatment of Alzheimer's disease or a systemic and/or localized inflammation. Therapeutically effective amounts of a given therapeutic agent will typically vary with respect to factors such as the type and severity of the disorder or disease being treated and the age, gender, and weight of the subject. The term can also refer to an amount of a therapeutic agent, or a rate of delivery of a therapeutic agent (e.g., amount over time), effective to facilitate a desired therapeutic effect. The precise desired therapeutic effect will vary according to the condition to be treated, the tolerance of the subject, the agent and/or agent formulation to be administered (e.g., the potency of the therapeutic agent, the concentration of agent in the formulation, and the like), and a variety of other factors that are appreciated by those of ordinary skill in the art. In some instances, a desired biological or medical response is achieved following administration of multiple dosages of the composition to the subject over a period of days, weeks, or years.

As used herein, the term "neuro-inflammatory disease" refers to an inflammatory disease or disorder in the central nervous system (CNS, brain, and spinal cord), and includes, but is not limited to, neurodegenerative diseases and disorders.

As used herein, the term "neurodegenerative disease" refers to a varied assortment of central nervous system disorders characterized by gradual and progressive loss of neural tissue and/or neural tissue function. A neurodegenerative disease is a class of neurological disorder or disease, and where the neurological disease is characterized by a gradual and progressive loss of neural tissue, and/or altered neurological function, typically reduced neurological function as a result of a gradual and progressive loss of neural tissue. Examples of neurodegenerative diseases include for example, but are not limited to, Alzheimer's disease (AD), Parkinson's disease (PD), Huntington's Disease, Amyotrophic Lateral Sclerosis (ALS, also termed Lou Gehrig's disease) and Multiple Sclerosis (MS), polyglutamine expansion disorders (e.g., HD, dentatorubropallidoluysian atrophy, Kennedy's disease (also referred to as spinobulbar muscular atrophy), spinocerebellar ataxia (e.g., type 1, type 2, type 3 (also referred to as Machado-Joseph disease), type 6, type 7, and type 17)), other trinucleotide repeat expansion disorders (e.g., fragile X syndrome, fragile XE mental retardation, Friedreich's ataxia, myotonic dystrophy, spinocerebellar ataxia type 8, and spinocerebellar ataxia type 12), Alexander disease, Alper's disease, ataxia telangiectasia, Batten disease (also referred to as Spielmeyer-Vogt-Sjogren-Batten disease), Canavan disease, Cockayne syndrome, corticobasal degeneration, Creutzfeldt-Jakob disease, ischemia stroke, Krabbe disease, Lewy body dementia, multiple system atrophy, Pelizaeus-Merzbacher disease, Pick's disease, primary lateral sclerosis, Refsum's disease, Sandhoff disease, Schilder's disease, spinal cord injury, spinal muscular atrophy (SMA), Steele-Richardson-Olszewski disease, Tabes *dorsalis*, and the like. In some embodiments, the neurodegenerative disease is Alzheimer's disease.

"Alzheimer's Disease" or "AD" as used herein refers to all forms of dementia, identified as a degenerative and terminal cognitive disorder. The disease may be static, the result of a unique global brain injury, or progressive, resulting in long-term decline in cognitive function due to damage or disease in the body beyond what might be expected from normal aging. The beta-amyloid protein, or AB, involved in Alzheimer's disease has several different molecular forms that collect between neurons. It is formed from the breakdown of a larger protein, called amyloid precursor protein. One form, beta-amyloid 42, is thought to be especially toxic. An abnormal level of this protein is found in the Alzheimer's brain, wherein the protein clump together to form plaques between neurons, leading to neuron function disruption.

The term "exosome", as used herein, refers to a cell-derived membranous vesicle. They refer to extracellular vesicles, which are generally of between 10 and 200 nm, for example in the range of 50-100 nm in size. In some embodiments, the extracellular vesicles can be in the range of 10-300 nm in size, for example 20-300 nm in size, 30-250 nm in size, for example 30-200 nm in size, for example, 30-90 nm in size. In some embodiments, the exosome can be about 50 nm in size. In some embodiments, the extracellular vesicles are defined by a lipidic bilayer membrane. Exosomes are released from most cell types and can be found in many biological fluids. The exosome used herein is derived from mesenchymal stem cells.

As used herein, a "mesenchymal stem cell," or "MSC" is a cell capable of differentiating into the mesenchymal cell lineages (i.e., osteoblasts, chondroblasts and adipocytes). As such, morphological and functional criteria well-known to those of ordinary skill in the art are used to identify these cells. See, Horwitz et al., supra; Dominici et al., supra; Trivedi P & Hematti P, "Derivation and immunological characterization of mesenchymal stromal cells from human embryonic stem cells," Exp. Hematol. Jan. 5, 2008; Trivedi P & Hematti P, "Simultaneous generation of CD34+ primitive hematopoietic cells and CD56+ mesenchymal stem cells from human embryonic stem cells cocultured with murine OP9 stromal cells," Exp. Hematol. 35:146-154 (2007); and US Published Patent Application No. 2006/0008902, each of which is incorporated herein by reference as if set forth in its entirety. MSCs produced by the methods described herein can be characterized according to phenotypic criteria. For example, mesenchymal progenitors or MSCs can be recognized by their characteristic mononuclear ovoid, stellate shape or spindle shape, with a round to oval nucleus. The oval elongate nuclei typically have prominent nucleoli and a mix of hetero- and euchromatin. These cells have little cytoplasm, but many thin processes that appear to extend from the nucleus. "MSC" may include cells that are isolated from tissues using, for example, cell surface markers selected from the list consisting of NGF-R, PDGF-R, EGF-R, IGF-R, CD81, CD9, CD10, CD13, CD29, CD49a, CD56, CD63, CD73, CD105, CD106, CD140b, CD146, CD271, MSCA-1, SSEA4, STRO-1 and STRO-3, or any combination thereof.

"Microglial cells" or "microglia" refer to a specialized population of macrophages that are found in the central nervous system (CNS). They remove damaged neurons and infections and are important for maintaining the health of the CNS. "Microglial cells" may include cells that are isolated from CNS using, for example, cell surface markers selected from the list consisting of AIF-1/iba1, F4/80, CX3CR1, CD11b, and CD68, or any combination thereof.

As used herein, the term "LPS" is an abbreviation for lipopolysaccharide, which is a macromolecule or compound containing lipid and polysaccharide moieties. LPS may also refer to a group of substances present or commonly found as a major constituent of the cell walls of certain bacteria, including the gram-negative strains. LPS can be highly immunogenic or antigenic in biological systems. As used herein, LPS also refers to lipopolysaccharide macromolecules or molecules, or fragments thereof, or selected portions of thereof.

As used herein, an "antagomir" is a nucleic acid oligomer that is designed to bind to a specific target microRNA via complementary base pairing. An antagomir may have a sequence that is wholly or partially complementary to the target microRNA sequence. Antagomirs may have a single stranded, double stranded, partially double-stranded, or hairpin structure.

The term "nucleic acid" as used herein means a polymer composed of nucleotides, e.g. deoxyribonucleotides or ribonucleotides.

The terms "ribonucleic acid" and "RNA" as used herein mean a polymer composed of ribonucleotides.

The terms "deoxyribonucleic acid" and "DNA" as used herein mean a polymer composed of deoxyribonucleotides.

The term "oligonucleotide" denotes single- or double-stranded nucleotide multimers, generally from about 2 to up to about 100 nucleotides in length. Suitable oligonucleotides may be prepared by the phosphoramidite method described by Beaucage and Carruthers, *Tetrahedron Lett.*, 22:1859-1862 (1981), or by the triester method according to Matteucci, et al., *J. Am. Chem. Soc.*, 103:3185 (1981), both incorporated herein by reference, or by other chemical methods using either a commercial automated oligonucleotide synthesizer or VLSIPSTM technology. When oligonucleotides are referred to as "double-stranded," it is understood by those of skill in the art that a pair of oligonucleotides exist in a hydrogen-bonded, helical array typically associated with, for example, DNA. In addition to the 100% complementary form of double-stranded oligonucleotides, the term "double-stranded," as used herein is also meant to refer to those forms which include such structural features as bulges and loops, described more fully in such biochemistry texts as Stryer, *Biochemistry*, Third Ed., (1988), incorporated herein by reference for all purposes.

The term "polynucleotide" refers to a single or double stranded polymer composed of nucleotide monomers.

The term "polypeptide" refers to a compound made up of a single chain of D- or L-amino acids or a mixture of D- and L-amino acids joined by peptide bonds.

The terms "identical" or percent "identity," in the context of two or more nucleic acids or polypeptide sequences, refer to two or more sequences or subsequences that are the same or have a specified percentage of amino acid residues or nucleotides that are the same (i.e., about 60% identity, preferably 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or higher identity over a specified region when compared and aligned for maximum correspondence over a comparison window or designated region) as measured using a BLAST or BLAST 2.0 sequence comparison algorithms with default parameters described below, or by manual alignment and visual inspection (see, e.g., NCBI web site or the like). Such sequences are then said to be "substantially identical." This definition also refers to, or may be applied to, the compliment of a test sequence. The definition also includes sequences that have deletions and/or additions, as well as those that have substitutions. As described below, the preferred algorithms can account for gaps and the like. Preferably, identity exists over a region that is at least about 10 amino acids or 20 nucleotides in length, or more preferably over a region that is 10-50 amino acids or 20-50 nucleotides in length. As used herein, percent (%) nucleotide sequence identity is defined as the percentage of amino acids in a candidate sequence that are identical to the nucleotides in a reference sequence, after aligning the sequences and introducing gaps, if necessary, to achieve the maximum percent sequence identity. Alignment for purposes of determining percent sequence identity can be achieved in various ways that are within the skill in the art, for instance, using publicly available computer software such as BLAST, BLAST-2, ALIGN, ALIGN-2 or Megalign (DNASTAR) software. Appropriate parameters for measuring alignment, including any algorithms needed to achieve maximal alignment over the full-length of the sequences being compared can be determined by known methods.

For sequence comparisons, typically one sequence acts as a reference sequence, to which test sequences are compared. When using a sequence comparison algorithm, test and reference sequences are entered into a computer, subsequence coordinates are designated, if necessary, and sequence algorithm program parameters are designated. Preferably, default program parameters can be used, or alternative parameters can be designated. The sequence comparison algorithm then calculates the percent sequence identities for the test sequences relative to the reference sequence, based on the program parameters.

One example of an algorithm that is suitable for determining percent sequence identity and sequence similarity are the BLAST and BLAST 2.0 algorithms, which are described in Altschul et al. (1977) *Nuc. Acids Res.* 25:3389-3402, and Altschul et al. (1990) *J. Mol. Biol.* 215:403-410, respectively. Software for performing BLAST analyses is publicly available through the National Center for Biotechnology Information (www.ncbi.nlm.nih.gov). This algorithm involves first identifying high scoring sequence pairs (HSPs) by identifying short words of length W in the query sequence, which either match or satisfy some positive-valued threshold score T when aligned with a word of the same length in a database sequence. T is referred to as the neighborhood word score threshold (Altschul et al. (1990) *J. Mol. Biol.* 215:403-410). These initial neighborhood word hits act as seeds for initiating searches to find longer HSPs containing them. The word hits are extended in both directions along each sequence for as far as the cumulative alignment score can be increased. Cumulative scores are calculated using, for nucleotide sequences, the parameters M (reward score for a pair of matching residues; always >0) and N (penalty score for mismatching residues; always <0). For amino acid sequences, a scoring matrix is used to calculate the cumulative score. Extension of the word hits in each direction are halted when: the cumulative alignment score falls off by the quantity X from its maximum achieved value; the cumulative score goes to zero or below, due to the accumulation of one or more negative-scoring residue alignments; or the end of either sequence is reached. The BLAST algorithm parameters W, T, and X determine the sensitivity and speed of the alignment. The BLASTN program (for nucleotide sequences) uses as defaults a wordlength (W) of 11, an expectation (E) or 10, M=5, N=−4 and a comparison of both strands. For amino acid sequences, the BLASTP program uses as defaults a wordlength of 3, and expectation (E) of 10, and the BLOSUM62 scoring matrix (see Henikoff and Henikoff (1989) *Proc. Natl. Acad. Sci. USA* 89:10915) alignments (B) of 50, expectation (E) of 10, M=5, N=−4, and a comparison of both strands.

The BLAST algorithm also performs a statistical analysis of the similarity between two sequences (see, e.g., Karlin and Altschul (1993) *Proc. Natl. Acad. Sci. USA* 90:5873-5787). One measure of similarity provided by the BLAST algorithm is the smallest sum probability (P(N)), which provides an indication of the probability by which a match between two nucleotide or amino acid sequences would occur by chance. For example, a nucleic acid is considered similar to a reference sequence if the smallest sum probability in a comparison of the test nucleic acid to the reference nucleic acid is less than about 0.2, more preferably less than about 0.01.

As used herein, the term "therapeutic agent" refers to any type of drug, medicine, pharmaceutical, hormone, antibiotic, protein, gene, growth factor, bioactive material, etc., used for treating, controlling, or preventing diseases or medical conditions. As used herein, the term "derivative" refers to a compound or peptide obtained from another compound (e.g., a lead or parent compound). In some embodiments, the therapeutic agent is an exosome isolated from a mesenchymal stem cell that is exposed to a conditioned media in which microglial cells are cultured in the presence of lipopolysaccharide (LPS) or a beta-amyloid oligomer. In some embodiments, the therapeutic agent is an exosome isolated from a mesenchymal stem cell that is exposed to a conditioned media in which microglial cells are cultured in the presence of lipopolysaccharide (LPS) or a beta-amyloid oligomer, wherein the exosome further comprises retinoid acid.

The term "increased" or "increase" as used herein generally means an increase by a statically significant amount; for the avoidance of any doubt, "increased" means an increase of at least 10% as compared to a reference level, for example an increase of at least about 20%, or at least about 30%, or at least about 40%, or at least about 50%, or at least about 60%, or at least about 70%, or at least about 80%, or at least about 90% or up to and including a 100% increase or any increase between 10-100% as compared to a reference level, or at least about a 2-fold, or at least about a 3-fold, or at least about a 4-fold, or at least about a 5-fold or at least about a 10-fold increase, or any increase between 2-fold and 10-fold or greater as compared to a reference level.

The term "reduced", "reduce", "reduction", or "decrease" as used herein generally means a decrease by a statistically significant amount. However, for avoidance of doubt, "reduced" means a decrease by at least 10% as compared to a reference level, for example a decrease by at least about 20%, or at least about 30%, or at least about 40%, or at least about 50%, or at least about 60%, or at least about 70%, or at least about 80%, or at least about 90% or up to and including a 100% decrease (i.e. absent level as compared to a reference sample), or any decrease between 10-100% as compared to a reference level.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon.

Compositions

In some aspects, disclosed herein is an exosome isolated from a mesenchymal stem cell, wherein the mesenchymal stem cell is exposed to a conditioned media in which microglial cells are cultured in the presence of lipopolysaccharide (LPS) or a beta-amyloid oligomer.

As noted above, an exosome refers to a cell-derived membranous vesicle. Exosomes refer to extracellular vesicles, which are generally of between 10 and 200 nm, for example in the range of 50-100 nm in size. In some embodiments, the exosomes can be in the range of 20-300 nm in size, for example 30-250 nm in size, for example 30-200 nm in size. In some embodiments, the exosomes can be in the range of about 10 nm to about 200 nm in size, about 30 nm to about 90 nm in size, about 40 nm to about 90 nm in size, about 40 nm to about 80 nm in size, about 40 nm to about 70 nm in size, about 40 nm to about 60 nm in size, about 45 nm to about 55 nm in size. In some embodiments, the exosomes can be about, for example, 30 nm, 35 nm, 40 nm, 45 nm, 50 nm, 55 nm, 60 nm, 65 nm, 70 nm, 75 nm, 80 nm, 90 nm, or 100 nm in size.

In some embodiments, the extracellular vesicles are defined by a lipidic bilayer membrane. Exosomes are released from most cell types and can be found in many biological fluids. The exosome used herein is derived from mesenchymal stem cells. In some embodiments, the exosome is derived from a mesenchymal stem cell that is exposed to a conditioned media in which microglial cells are cultured in the presence of LPS and/or a beta-amyloid oligomer. In some embodiments, the exosome comprises a protein selected from the group consisting of CD81, CD9, and CD63.

As noted above, a "mesenchymal stem cell," "MSC," or "mesenchymal progenitor" used herein refers to a multipotent stromal cell that is capable of differentiating into a variety of cells such as the mesenchymal cell lineages (i.e., osteoblasts, chondroblasts and adipocytes). In some embodiments, the mesenchymal stem cell is a primary human mesenchymal stem cell. In some embodiments, the mesenchymal stem cell is a mesenchymal stem cell line. In some embodiments, the mesenchymal stem cell is an engineered mesenchymal cell.

The exosome of any preceding aspect is isolated from a mesenchymal stem cell, wherein the mesenchymal stem cells is exposed to a conditioned media in which microglial cells are cultured in the presence of LPS or a beta-amyloid oligomer. The length of exposing the MSCs to the LPS or the beta-amyloid oligomer can be, for example, less than 1 min, 2 mins, 3 mins, 4 mins, 5 mins, 6 mins, 7 mins, 8 mins, 9 mins; more than 10 mins, 20 mins, 30 mins, 40 mins, or 50 mins; more than 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 22 hours, or 23 hours; more than 1 day, 2 days, 3 days, 4 days, 5 days, 6 days, 7 days, 8 days, 9 days, 10 days, 11 days, 12 days, 13 days, 14 days, or 15 days.

The term "amyloid-β" (or "Aβ", "beta-amyloid") as used herein has the standard meaning understood in the art. The full-length beta amyloid precursor protein (APP, External Ids: HGNC: 620; Entrez Gene: 351; Ensembl: ENSG00000142192; OMIM: 104760; UniProtKB: P05067) occurs in nature in several variants, up to 770 amino acids in length, with other characterized species including variants 695, 639, 574, 547, 484, 352, 327 and 305 amino acids in length. Amyloid-β polypeptides may be of various lengths, including 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, 500, 501, 502, 503, 504, 505, 506, 507, 508, 509, 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, 541, 542, 543, 544, 545, 546, 547, 548, 549, 550, 551, 552, 553, 554, 555, 556, 557, 558, 559, 560, 561, 562, 563, 564, 565, 566, 567, 568, 569, 570, 571, 572, 573, 574, 575, 576, 577, 578, 579, 580, 581, 582, 583, 584, 585, 586, 587, 588, 589, 590, 591, 592, 593, 594, 595, 596, 597, 598, 599, 600, 601, 602, 603, 604, 605, 606, 607, 608, 609, 610, 611, 612, 513, 614, 615, 617, 618, 619, 620, 621, 622, 623, 624, 625, 626, 627, 628, 629, 630, 631, 632, 633, 634, 635, 636, 637, 638, 639, 640, 641, 642, 643, 644, 645, 646, 647, 648, 649, 650, 651, 652, 653, 654, 655, 656, 657, 658, 659, 660, 661, 662, 663, 664, 665, 666, 667, 668, 669, 670, 671, 672, 673, 674, 675, 676, 677, 678, 679, 680, 681, 682, 683, 684, 685, 686, 687, 688, 689, 690, 691, 692, 693, 694, 695, 696, 697, 698, 699, 700, 701, 702, 703, 704, 705, 706, 707, 708, 709, 710, 711, 712, 713, 714, 715, 716, 717, 718, 719, 720, 721, 722, 723, 724, 725, 726, 727, 728, 729, 730, 731, 732, 733, 734, 735, 736, 737, 738, 739, 740, 741, 742, 743, 744, 745, 746, 747, 748, 749, 750, 751, 752, 753, 754, 755, 756, 757, 758, 759, 760, 761, 762, 763, 764, 765, 766, 767, 768, 769, 770 amino acids in length. In some embodiments, Aβ polypeptides are at least 80% homologous to the wild-type amyloid-β protein, or naturally occurring variants, over their length, preferably 85%, 90%, 95%, 99% or 100% homologous. In some embodiments, the Aβ polypeptides are 40 or 42 amino acids in length. In some embodiments, the Aβ polypeptide comprises the amino acid positions 1-42 of SEQ ID NO: 1.

In some embodiments, the exosome of any preceding aspect further comprises a therapeutic agent. In some embodiments, the therapeutic agent is an anti-inflammatory agent. In some embodiments, the therapeutic agent is retinoic acid. In some embodiments, the therapeutic agent is All-trans-retinoic acid (ATRA).

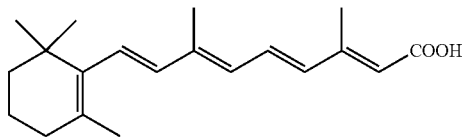 [SMILES: CC1=C(/C=C/C(C)=C/C=C/C(C)=C/C(=O)O)C(C)(C)CCC1]

ATRA

In some embodiments, the therapeutic agent is selected from the group consisting of pioglitazine, resveratrol, and curcumin. In some embodiments, the therapeutic agent is selected from the group consisting of leriglitazone, rosiglitazone, galantamine, tacrine, and BDNF.

Methods of Use

In some aspects, disclosed herein is a method of reducing inflammation in a subject, comprising administering to the subject a therapeutically effective amount of an exosome isolated from a mesenchymal stem cell, wherein the mesenchymal stem cell is exposed to a conditioned media in which microglial cells are cultured in the presence of lipopolysaccharide (LPS) or a beta-amyloid oligomer. The inflammation can be systemic inflammation or tissue-localized inflammation (e.g., neuro-inflammation).

It should be understood herein that the "conditioned media" refers to a cell culture media where microglial cells are cultured in the presence of LPS and/or a beta-amyloid oligomer for a certain period of time, such as for about 5 seconds, 10 seconds, 20 seconds, 30 seconds, 40 seconds, or 50 seconds; 1 min, 2 min, 5 min, 10 min, 15 min, 20 min, 30 min, 40 min, or 50 min; 1 hour, 2 hours, 3 hours, 4 hours, 5 hours, 6 hours, 7 hours, 8 hours, 9 hours, 10 hours, 12 hours, 18 hours, or 24 hours; 1.5 days, 2 days, 3 days, 4 days, 5 days, 6 days, 7 days, 8 days, 9 days, 10 days, 12 days, 14 days, 16 days, 18 days, 20 days, 24 days, 28 days, or 30 days. The conditioned media is then used to culture the mesenchymal stem cells for producing the exosomes.

It should be understood herein that the "reduction" can be a decrease by at least 10% as compared to a reference level, for example a decrease by at least about 20%, or at least about 30%, or at least about 40%, or at least about 50%, or at least about 60%, or at least about 70%, or at least about 80%, or at least about 90% or up to and including a 100% decrease (i.e. absent level as compared to a reference sample), or any decrease between 10-100% as compared to a reference level, such as a level in a general or study population or a level prior to treatment.

In some aspects, disclosed herein is a method of treating a neurodegenerative disease in a subject, comprising administering to the subject a therapeutically effective amount of an exosome isolated from a mesenchymal stem cell, wherein the mesenchymal stem cell is exposed to a conditioned media in which microglial cells are cultured in the presence of lipopolysaccharide (LPS) or a beta-amyloid oligomer. The neurodegenerative disease is selected from the group consisting of Alzheimer's disease, Parkinson's Disease, Multiple Sclerosis, Huntington's Disease, and Traumatic Brain Injury. In some embodiments, the neurodegenerative disease is Alzheimer's disease.

In some aspects, disclosed herein is a method of treating Alzheimer's disease in a subject, comprising administering to the subject a therapeutically effective amount of an exosome isolated from a mesenchymal stem cell, wherein the mesenchymal stem cell is exposed to a conditioned media in which microglial cells are cultured in the presence of lipopolysaccharide (LPS) or a beta-amyloid oligomer.

As noted above, "Alzheimer's disease" as used herein refers to all forms of dementia, identified as a degenerative and terminal cognitive disorder. The disease may be static, the result of a unique global brain injury, or progressive, resulting in long-term decline in cognitive function due to damage or disease in the body beyond what might be expected from normal aging. The beta-amyloid protein, or Aβ, involved in Alzheimer's has several different molecular forms that collect between neurons. Amyloid peptides are the main cause of inflammation that leads to neuronal degeneration. Accordingly, it should be understood and contemplated herein that each of the symptoms including, for example, increased levels of neuro-inflammation, abnormal levels and accumulation of Aβ in a central nervous system, and long-term decline in cognitive function are included within the definition of "Alzheimer's disease."

The disclosed methods can be performed any time prior to the onset of Alzheimer's disease, even prior to the apparent accumulation of Aβ oligomer in CNS of a subject. In one aspect, the disclosed methods can be employed 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1 years; 12, 11, 10, 9, 8, 7, 6, 5, 4, 3, 2, or 1 months; 30, 29, 28, 27, 26, 25, 24, 23, 22, 21, 20, 19, 18, 17, 16, 15, 14, 13, 12, 11, 10, 9, 8, 7, 6, 5, 4, or 3 days; 60, 48, 36, 30, 24, 18, 15, 12, 10, 9, 8, 7, 6, 5, 4, 3, or 2 hours prior to the onset of Alzheimer's disease; or 1, 2, 3, 4, 5, 6, 7, 8, 9, 10, 11, 12, 15, 18, 24, 30, 36, 48, 60 hours; 3, 4, 5, 6, 7, 8, 9, 10, 11, 12, 13, 14, 15, 16, 17, 18, 19, 20, 21, 22, 23, 24, 25, 26, 27, 28, 29, 30, 45, 60, 90 or more days; 4, 5, 6, 7, 8, 9, 10, 11, 12 or more months; 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 45, or 60 years after the onset of Alzheimer's disease.

Dosing frequency for the composition of any preceding aspects, includes, but is not limited to, at least once every year, once every two years, once every three years, once every four years, once every five years, once every six years, once every seven years, once every eight years, once every nine years, once every ten year, at least once every two months, once every three months, once every four months, once every five months, once every six months, once every seven months, once every eight months, once every nine months, once every ten months, once every eleven months, at least once every month, once every three weeks, once every two weeks, once a week, twice a week, three times a week, four times a week, five times a week, six times a week, daily, two times per day, three times per day, four times per day, five times per day, six times per day, eight times per day, nine times per day, ten times per day, eleven times per day, twelve times per day, once every 12 hours, once every 10 hours, once every 8 hours, once every 6 hours, once every 5 hours, once every 4 hours, once every 3 hours, once every 2 hours, once every hour, once every 40 min, once every 30 min, once every 20 min, or once every 10 min. Administration can also be continuous and adjusted to maintaining a level of the compound within any desired and specified range.

In some embodiments, the exosomes can be in the range of 20-300 nm in size, for example 30-250 nm in size, for example 30-200 nm in size. In some embodiments, the exosomes can be in the range of about 10 nm to about 200 nm in size, about 30 nm to about 90 nm in size, about 40 nm to about 90 nm in size, about 40 nm to about 80 nm in size, about 40 nm to about 70 nm in size, about 40 nm to about 60 nm in size, about 45 nm to about 55 nm in size. In some embodiments, the exosomes can be about, for example, 30 nm, 35 nm, 40 nm, 45 nm, 50 nm, 55 nm, 60 nm, 65 nm, 70 nm, 75 nm, 80 nm, 90 nm, 95 nm, 100 nm, 105 nm, 110 nm, 115 nm, 120 nm, 125 nm, 130 nm, 135 nm, 140 nm, 145 nm, 150 nm, 155 nm, 160 nm, 165 nm, 170 nm, 175 nm, 180 nm, 185 nm, 190 nm, 195 nm, or 200 nm in size. In some embodiments, the extracellular vesicles are defined by a lipidic bilayer membrane. In some embodiments, the exosome comprises a protein selected from the group consisting of CD81, CD9, and CD63.

In some embodiments, the mesenchymal stem cell is selected from the group consisting of a primary human mesenchymal stem cell and a mesenchymal stem cell line. In some embodiments, the mesenchymal stem cell is a primary human mesenchymal stem cell. In some embodiments, the mesenchymal stem cell is a mesenchymal stem cell line. In some embodiments, the mesenchymal stem cells may originate from bone marrow. In other embodiments, the mesenchymal stem cells may originate from cord cells, adipose tissue, molar cells, or amniotic fluid. In some embodiments, the mesenchymal stem cell is an engineered mesenchymal cell.

The exosome of any preceding aspect is isolated from a mesenchymal stem cell, wherein the mesenchymal stem cells is exposed to a conditioned media in which microglial cells are cultured in the presence of LPS or a beta-amyloid oligomer. The length of exposing the MSCs to the conditioned media in which microglial cells are cultured in the presence of LPS or the beta-amyloid oligomer can be, for example, less than 1 min, 2 mins, 3 mins, 4 mins, 5 mins, 6 mins, 7 mins, 8 mins, 9 mins; more than 10 mins, 20 mins, 30 mins, 40 mins, or 50 mins; more than 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 22 hours, or 23 hours; more than 1 day, 2 days, 3 days, 4 days, 5 days, 6 days, 7 days, 8 days, 9 days, 10 days, 11 days, 12 days, 13 days, 14 days, or 15 days.

In some embodiments, the exosome of any preceding aspect further comprises a therapeutic agent. In some embodiments, the therapeutic agent is retinoic acid. In some embodiments, the therapeutic agent is All-trans-retinoic acid (ATRA).

In some embodiments, the exosome decreases microglial cell activation in the subject.

In some embodiments, the exosome decreases production of an inflammatory mediator from a microglial cell. In some embodiments, the inflammatory mediator is selected from the group consisting of IL-6, IL-1β, CD-16, CD-54, PPAR-g, TNF-a, nitric oxide (NO), and Reactive Oxygen Species (ROS).

In some embodiments, the compositions herein can further comprise a pharmaceutically acceptable carrier.

The compositions of the present invention can be administered to the appropriate subject in any manner known in the art, e.g., orally intramuscularly, intravenously, sublingual mucosal, intraarterially, intrathecally, intradermally, intraperitoneally, intranasally, intrapulmonarily, intraocularly, intravaginally, intrarectally, subcutaneously, or through by inhalation. Parenteral administration, if used, is generally characterized by injection. Injectables can be prepared in conventional forms, either as liquid solutions or suspensions, solid forms suitable for solution or suspension in liquid prior to injection, or as emulsions. In some embodiments, the composition disclosed herein is administered intranasally. A more recently revised approach for parenteral administration involves use of a slow release or sustained release system, such that a constant level of dosage is maintained. In some embodiments, the exosome is administered to the subject via an intranasal administration.

EXAMPLES

The following examples are set forth below to illustrate the compounds, systems, methods, and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Example 1. Introduction

Inflammation is a hallmark of age-related diseases such as diabetes, cardiovascular disease, arthritis, and Alzheimer's disease (AD). Microglia is the resident macrophage of the brain and it is continuously surveying the brain for pathogens. Activation of microglia TLRs by different pathogen-associated molecular patterns (PAMPs) (e.g. LPS and AβOs) leads to the release of pro-inflammatory cytokines and reactive oxygen species (ROS). The current view is that the beneficial action of activated microglia occurs acutely but continues activation has detrimental effects on neurons.

In this regard, chronic neuroinflammation is the main target to fight neurodegeneration in AD. Chronic inflammatory response has been associated with neurotoxic detrimental effects mediated by the release of proinflammatory cytokines/chemokines, ROS, NO and neurotoxins. For example, in AD the endogenous inflammatory responses, triggered by the AβOs and Tau toxic oligomers, are aiming to repair the damaged tissue but the excessive production of pro-inflammatory cytokines becomes the driving force for the pathological progression of AD.

The use of stem cells has emerged as a promising therapeutic approach in many inflammatory-related diseases. The initial concept of stem cell therapy aimed at replacing lost neurons, but it was found that the MSC survival and differentiation into grafted tissue was low. More recent studies show that MSCs suppress inflammatory processes mainly through secretome-based paracrine mechanism and not directly through their differentiation. One of the most important biological properties of MSCs is that they can sense pathological conditions, such as inflammation, and respond to these events through secretome-based paracrine mechanism. Exosomes are part of the paracrine function and bring the benefits of MSCs regulatory function without the side effects associated to stem cell transplantation. Exosomes are smaller than their parent cells, easier to produce and store and they are also less immunogenic than their parent cells because of their lower content in membrane-bound proteins. Mesenchymal stem cells are multipotent progenitor cells and can produce more exosomes in comparison to other cell sources also, it has been shown that MSCs-derived exosomes are poorly immunogenic, as opposed to dendritic cells-derived exosomes. Exosomes have been successfully used to deliver therapeutics to the brain and many studies have shown that exosomes can pass through the BBB after intranasal administration. It has been shown that curcumin loaded exosomes were delivered effectively to microglia cells after intranasal administration and were able to reverse LPS-induced brain inflammation. In summary, exosomes have low immunogenicity and long half-life in circulation and their ability to cross the brain-blood barrier (BBB) along with their anti-inflammatory properties and regulatory functions make them useful for the treatment of neurological disorders. Furthermore, it has been shown that there is an active mechanism of miRNA sorting into exosomes. Bioinformatics analysis of gene targets of the upregulated miRNAs and their role in key pathways can be a very helpful tool to understand how MSCs regulate their exosomal cargo to restore homeostasis.

Herein, the examples disclose the cross talk between activated microglia cells and MSCs and how the secretome from LPS or ABO activated microglia cells can affect the regulatory functions of MSC-derived exosomes. These examples herein also show the miRNA expression profile of exosomes isolated from MSC or educated MSCs.

Example 2. Methods

Cell lines. hMSCs were obtained from the Institute for Regenerative Medicine Texas A&M Health Science Center (female donor #8011L) and from Lonza. MSCs were cultured in a Minimum Essential Medium (αMEM) supplemented with 16.5% FBS, 2 mM L-glutamine and 1% penicillin/streptomycin at 37° C. and 5% $CO_2$. Human microglia cells (HMC3) cell line was purchased by ATCC® CRL-3304 TM and were cultured in Eagle's Minimum Essential Medium (EMEM) supplemented with 10% FBS and 1% penicillin/streptomycin.

Exosome isolation and characterization. Mesenchymal cells were cultured in aMEM media, as described above supplemented with 16.5% exosome depleted FBS. Mesenchymal stem cell conditioned media was collected and, in most cases, MSC EVs were isolated using the total exosome isolation solution (Invitrogen) as described in manufacturer's instructions. When total secretome, soluble fraction and extracellular vehicle fraction were used (FIG. 1) exosomes were isolated using ultracentrifugation at 120,000×g for 3 hours at 4° C. The particle concentration was estimated in particles/ml by nanoparticle tracking analysis. The size distribution and morphology of exosomes was assessed by Nanoparticle Tracking Analysis (Nanosight) and Transmission Electron Microscopy (TEM), respectively.

Abeta oligomers preparation. Briefly, Aβ was dissolved in ice cold HFIP to a final concentration of 1 mM. 220 ul of aliquots were incubated for about 30 minutes at room temperature to evaporate HFIP and vacuum dried for 2 hours at room temperature. The tubes with the peptide film were stored at −80° C. Aβ pre-treated with HFIP and was dissolved in DMSO to a final concentration of 5 mM and then was added to phenol red-free Ham's/F12 to a final concentration of 100 μM and incubated for 24 hours at 4. TEM imaging was performed to confirm the oligomer formation.

Figures 2A, 2B, 2C:
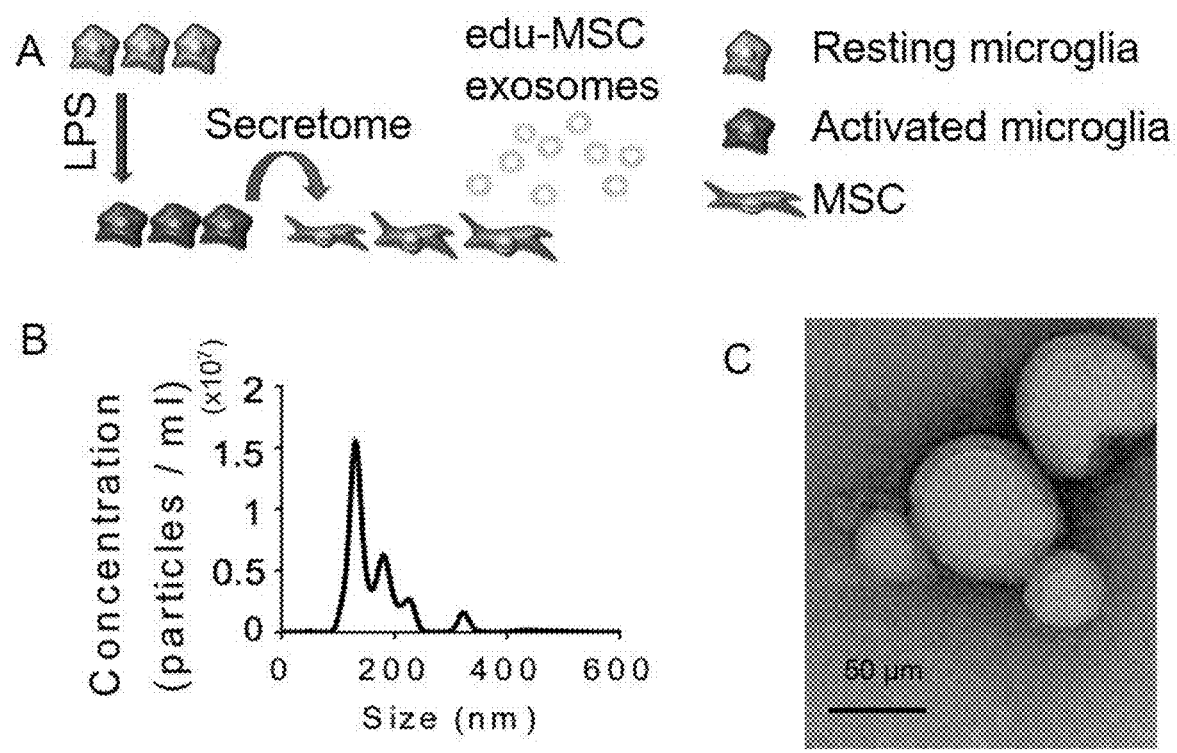
FIGS. 2A-2C show preparation and characterization of edu-MSC exosomes.

Inflammatory priming of MSCs. HMC3 cells were treated with 1 μg/ml LPS (from *E. coli* 055:B5 γ-irradiated, Sigma) or 10 μM AbOs for 72 hours (FIG. 2A, step 1). Then, the conditioned media of the LPS-challenged HMC3 cells was collected and used to prime MSCs (FIG. 2A, Step 2). After priming of MSCs for three days, the supernatant of the proinflammatory educated hMSCs was collected and the exosomes were isolated as described above (FIG. 2A, Step 3).

In vitro experiments-LPS/ABO challenging. To test the effect of the secretome and its fractions on LPS-challenged cells, two different bone marrow hMSCs batches, one provided from Texas A&M College of Medicine's Institute for Regenerative Medicine and one from Lonza were used. The conditioned media from $1×10^7$ cells was collected and ultra-centrifuged at 120,000×g for 3 hours at 4° C. The pellet, which contains the exosomes, was re-dispersed in 10 ml PBS while the supernatant was used as the soluble fraction of the secretome. Then, human microglia cells (HMC3) were challenged with LPS (1 μg/ml) in presence of the total secretome, the soluble fraction or the exosome fraction for 15 hours.

Figures 3A, 3B:
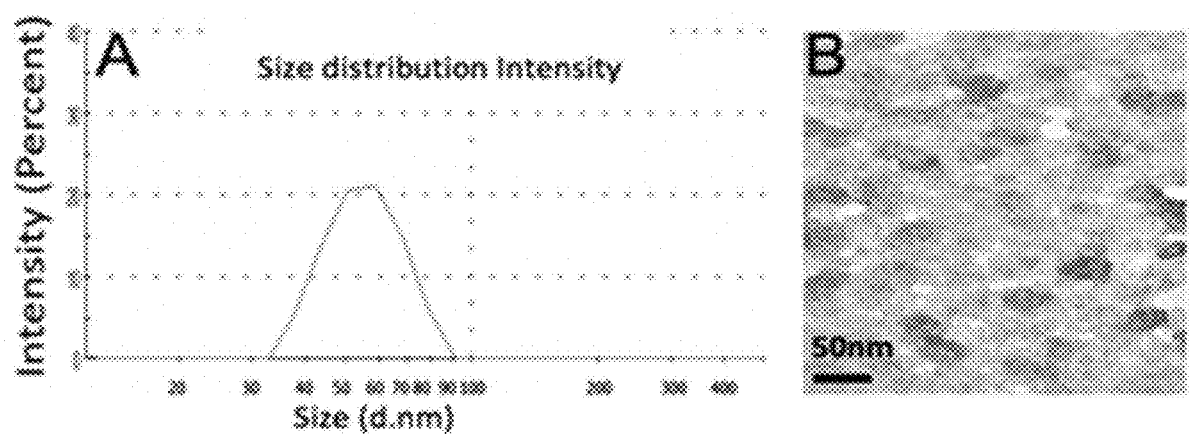
FIGS. 3A and 3B show exosome characterization.

Expression of exosome markers (CD9, CD63, CD81) was also confirmed by western blot. The particle concentration was estimated in particles/ml by nanoparticle tracking analysis. The protein content of the samples was also measured. The size distribution and morphology of exosomes was assessed by Dynamic Light Scattering (DLS) and Transmission Electron Microscopy (TEM), respectively. According to DLS data, the average hydrodynamic diameter was about 55 nm (FIG. 3A) and the same size was confirmed by TEM (FIG. 3B).

To test the efficacy of MSC exosomes and edu-MSC exosomes to inhibit microglia activation, human microglia cells (HMC3) were challenged with 1 μg/ml LPS in complete media in presence of exosomes for 72 hours (FIG. 2A, Step 4). At the end of the experiment cells were washed three times with PBS and the effect of different treatments was tested by PCR, Iba1 expression and ROS production.

Polymerase Chain Reaction (PCR). Total RNA was isolated using TRIzol regent (Life Technologies) and pretreated with DNase I (Life Technologies) to remove any contaminating DNA. 1 μg of RNA was reverse transcribed using Maxima First Strand cDNA Synthesis Kit for RT-qPCR (Thermo Fisher Scientific) as described in manufacturer's instructions. Quantitative real-time PCR (qPCR) was performed on the BioRad CFX384™ Real-time PCR Detection system using GeneCopoeia 5× SYBR master mix (GeneCopoeia). The reaction was performed using the following program: 95° C. or 3 mins. Followed by 45 cycles of 95° C. for 10 s, 60° C. for 1 min and 72° C. for 15 s. All samples were run in four replicates and the data were analyzed using normalized gene expression (ΔΔCt). Expression of all genes was normalized to control GAPDH. The sequences of all primers used in this study are as follows:

NFκB FwPr
5'-GCA GAT GGC CCA TAC CTT CA-3' (SEQ ID NO: 2)
NFκB RvPr
5'-CAC CAT GTC CTT GGG TCC AG-3' (SEQ ID NO: 3)
CD16 FwPr
5'-ATG TGT CTT CAG AGA CTG TGA AC-3' (SEQ ID NO: 4)
CD16 RvPr
5'-TTT ATG GTC CTT CCA GTC TCT TG-3' (SEQ ID NO: 5)
CD54 FwPr
5'-ACA CTA GGC CAC GCA TCT G-3' (SEQ ID NO: 6)
CD54 RvPr
5'-TCA TGG GGC TAT GTC TC-3' (SEQ ID NO: 7)
TNFα FwPr
5'-TGT AGC CCA TGT AGC AAA-3' (SEQ ID NO: 8)
TNFα RvPr
5'-TTG AAG AGG ACC TGG GAG TAG A-3' (SEQ ID NO: 9)
IL 10 FwPr
5'-GGG AGA ACC TGA AGA CCC TC-3' (SEQ ID NO: 10)
IL 10 RvPr
5'-ATA GAG TCG CCA CCC TGA AGA CCC TC-3' (SEQ ID NO: 11)
IL-1β FwPr
5'-AGGAGCACTTCATCTGTTTAGG-3' (SEQ ID NO: 12)
IL-1β RvPr
5'-GCCAATCTTCATTGCTCAAGTG-3' (SEQ ID NO: 13)

Iba1 immunocytochemistry. After treatment microglia cells were fixed with 4% paraformaldehyde and permeabilized with 0.5% triton for 5 minutes. For blocking, 3% normal donkey serum with 1% bovine serum albumin in PBS was used for 30 minutes. Then the cells were incubated with Iba-1 antibody diluted 1:250 in 1% BSA in PBS for 2 hours at room temperature. After 2 washes with PBS and another step of blocking with 3% BSA in PBS for 30 minutes, the cells were incubated with a secondary Dylight 594 conjugated anti-rabbit IgG for 2 hours at room temperature. Then the nucleus was stained with 1 µg/ml Hoechst for 5 min. The staining of Iba-1 was visualized by fluorescence microscopy ROS production. ROS formation was estimated using Carboxy-H2DCFDA as an indicator. This compound reacts with ROS to form fluorescent dichlorofluorescein (DCF). HMC3 cells after treatment were washed with PBS and then loaded with carboxy-H2DCFDA at a final concentration of 5 µM in a culture medium supplemented with 10% serum for 30 min. Fluorescence images were taken using BZ Series Life Science Microscope from Keyence.

Exosome RNA isolation. Exosome total RNA was isolated using a combination of phase separation and precipitation as previously described. Briefly TRIzol LS reagent (500 µL) (Thermo Fisher Scientific) and chloroform (200 µL) were added to exosome pellet. Samples were then mixed thoroughly and incubated at room temperature for 10 min. Phase separation was performed by centrifugation at 12,000 g at 4° C. for 15 min. The upper aqueous phase was collected, and 10% volume of sodium acetate (3 M, pH 5.5) was added to each sample. Four microliters of 5 mg/ml glycogen and 2.5 times the acquired aqueous volume of absolute ethanol were added. Samples were mixed, incubated overnight at −80° C. and then centrifuged at 16,000 g at 4° C. for 30 min to pellet RNA. The pellet was washed with 70% ethanol and centrifuged at 16,000 g at 4° C. for 5 min. Pellets were dried for 30 minutes and resuspended in 50 µL of nuclease-free water and purified RNA was quantified using Nanodrop.

Animal studies. All animal procedures were conducted in accordance with the NIH guidelines for the Care and Use of Laboratory Animals and approved by the Institutional Animal Care and Use Committee of the University of South Florida. C57BL/6 male mice (11-12 weeks old) were purchased from Harlan. To study the biodistribution of exosomes after intranasal administration, mice were injected intraperitoneally with LPS at a dose of 250 µg/kg for 7 consecutive days and with a dose of 1 mg/kg for three more days. On day 10 mice were administered intranasal with DiR-labelled exosomes and sacrificed 2 hours post administration. For DiR labelling, the exosome dispersion was incubated with 1 mM DiR at room temperature for 2 hours and the exosomes were precipitated again. The explanted organs were also imaged using IVIS. To study the effect of MSC exosomes and educated-MSC exosomes on LPS-induced inflammation mouse model, mice were injected intraperitoneally with LPS at a dose of 250 µg/kg for 7 consecutive days and with a dose of 1 mg/kg for three more days. On days 8, 9 and 10 mice were administered MSC exosomes or educated-MSC exosomes intranasal, at a dose of $20 \times 10^9$ particles per mouse. On day 11 the mice were sacrificed, and the brains were harvested. All brains were fixed overnight in 10% buffered formalin, cryoprotected in 30% sucrose for 24 hours at 4° C. and sectioned using cryostat. Brains were analyzed using immunohistochemistry for anti-ionized calcium binding adaptor protein (Iba-1), anti-Glial Fibrillary Acidic Protein (GFAP), Myelin Basic Protein (MBP) and Thioflavin S staining for abeta amyloid deposition.

Iba1-GFAP and MBP immunohistochemistry. Brain cryosections (40 uM thickness) were heated with antigen retrieval solution for 45 min at 90° C. and washed with PBS. Sections were permeabilized with 0.2% Triton X-100 in PBS followed by blocking with 10% Goat serum solution in 0.1% Triton X-100 for 1 hour at room temperature. Next, sections were incubated with chicken GFAP (1:1000, chicken polyclonal, Millipore AB5541) and rabbit anti-ionized calcium binding adaptor molecule (Iba1) (1:500, rabbit polyclonal, Wako 019-19741) diluted in antibody solution containing 5% serum and 0.5% Triton X-100 in PBS overnight at 4° C. Secondary antibody mixture containing Alexa Fluor 488-conjugated goat anti-chicken (1:1000, Abcam, ab150169), and DyLight 594-conjugated goat anti-rabbit (1:1000, Thermo Fisher, A11008) was prepared in PBS. Sections were washed three times in PBS for 5 min each, dried, and cover-slipped using Vectashield anti-fade hardset mounting medium (Vector, H-1500). Sections were visualized using Keyence.

For MBP staining sections were incubated with Anti-Myelin Basic Protein antibody (1:500 Abcam 40390) diluted in antibody solution containing 5% serum and 0.5% Triton X-100 in PBS overnight at 4° C. The sections were then washed in PBS three times and incubated with DyLight 488 goat anti-rabbit secondary antibody (1:1000, Thermo Fisher, 35552) for 2 h at room temperature. Sections were washed three times in PBS for 5 min each, dried, and cover-slipped using Vectashield anti-fade hardset mounting medium (Vector, H-1500). Sections were visualized using Keyence.

Thioflavin s. Thioflavin S solution (1%) was prepared in distilled water and filtered through 0.8 uM syringe filter. Cryo-Sections were washed twice in PBS and then stained with Thioflavin S solution for 30 minutes. After staining, sections are washed 5 times with PBS and mounted with antifade mounting media.

Elisa. The hippocampus and cerebral cortex of all brains were dissected and kept at −80° C. Frozen samples were homogenized in 100 mg/ml lysis buffer and centrifuged at 10000 rpm for 15 minutes. The supernatant was analyzed for the protein content using a micro BCA protein assay kit (Thermo Scientific). The levels of IL-1ß (Invitrogen), IL-6 (biogems) and TNF-α (Invitrogen) were measured using Elisa kits according to manufacturer's instructions.

Morris water maze test. The Morris water maze (MWM) test for studying spatial learning and memory in mice, was performed as described previously. The MWM program was purchased from Noldus EthoVision. A circular pool was filled with opaque water maintained at 25° C. An escape platform was submerged 1 cm below the surface of the water in the NE quadrant. During the training trials, the mice were placed into the water in a random quadrant (SE, SW or NW) and allowed to locate the hidden platform for 60 s. Then, the mice were allowed to remain on the platform or were placed on the platform for 10 s at the end of each trial. All mice were trained with three trials per day for 7 days. After the training, mice were injected intraperitoneally with LPS at a dose of 250 µg/kg for 7 consecutive days and with a dose of 1 mg/kg for three more days. On days 7, 8 and 9 mice were administered MSC exosomes or educated-MSC exosomes intranasal, at a dose of $20 \times 10^9$ particles per mouse. The cumulative duration of each mouse in the platform zone was recorded.

Rotarod test. Rotarod was used to test the sensorimotor coordination and motor learning ability of mice. Rotarod trials were performed on day 10 of the animal experiment. The mice were first introduced to the rotarod platform that consist of 5 cylinders, rotating with an initial speed of 4 rpm which gradually increases up to 40 rpm for a maximum duration of 5 minutes. The time of fall from the rotarod was recorded. All mice were tested for 3 trials with time intervals of 30 minutes.

Open field test. The anxiety-like behavior and locomotor activity were monitored using Open Field test as previously described. The mice introduced to an open arena subdivided into nine small arenas that composed of perimeter, corner and center zones. The animals were tracked for period of 10 mins using Anymaze software. The mice were gently placed in the center of arena and their activity in different zones was recorded for 10 mins and analyzed.

Differentially expressed miRNAs and miRNA target prediction. miRNA expression was examined in MSC exosomes and educated-MSC exosomes. This was performed using a miRNA sequencing performed by Arraystar (Rockville, USA). Raw sequencing data generated from Illumina NextSeq 500. Trimmed reads (trimmed 3'-adaptor bases) are aligned to reference genome. Hierarchical Clustering, miRNA Target analysis, Target Gene Ontology (GO), Target Pathway Analysis, scatter plots and volcano plots are performed for the differentially expressed miRNA in R or Python environment for statistical computing and graphics. miRDeep2 software was used to quantify known miRNA. The CPM value for miRNA were calculated with R package edgeR. The differentially expressed miRNA were filtered using R package edgeR. GO and KEGG pathway analysis were performed based on the top 10 differentially expressed miRNAs.

Statistical Analysis. All results are presented as the mean±SEM from at least three experiments, unless otherwise stated. Student's two-tailed t-test or one-way ANOVA, followed by Tukey multiple comparison test, to determine statistical significance ($p<0.05$) of the experimental data.

Example 3. Effect of MSC Total Secretome, Soluble Fraction and Exosome Fraction on LPS-Induced Human Microglia Activation It is known that MSCs suppress inflammatory processes through secretome-based paracrine mechanisms, but it is not clear what is the role of the soluble and the exosome fraction of the secretome on the inflammation suppression. To gain more insight into that, the effect of MSC total secretome was examined, the soluble fraction or the exosome fraction, on LPS-activated human microglia cells. The activation of Toll-like receptor 4 (TLR4) by LPS mediates microglial activation and production of proinflammatory cytokines. RT-qPCR data revealed that LPS-challenged microglia showed increased gene expression of TNF-α, IL-6 and IL-1β proinflammatory cytokines but in the presence of the MSC secretome, of both batches of MSCs (Texas A&M and Lonza), the expression levels of all these cytokines were significantly decreased (FIG. 1A). The expression levels of these cytokines, in the case that microglia cells were challenged with LPS in the presence of the soluble fraction of the secretome, was not significantly decreased as opposed to the exosome fraction which, in most cases, significantly inhibited microglia activation as it is indicated by the low expression level of all three cytokines tested. LPS-induced activation of microglia cells is known to also result in the production of reactive oxygen species (ROS). As seen in FIG. 1B, LPS-treated microglia cells show increased levels of ROS but treatment of cells with the total secretome or the exosome fraction of the secretome, from both batches of MSCs, significantly decreased ROS levels. There was no significant decrease on the ROS levels when the LPS-activated cells were treated with the soluble fraction, confirming that the antioxidant effect of secretome is mainly attributed to the exosome fraction of the total secretome. Iba-1 staining, as an indication of microglia activation, was also studied. As seen in FIG. 1C, LPS-activated cells exhibited the phenotype of activated microglia with enlarged body and short protrusions, while cells treated with the total secretome or the exosome fraction showed significantly lower Iba1 fluorescence intensity with resting microglia phenotype. There was a significant decrease on the Iba1 intensity when the LPS-activated cells were treated with the soluble fraction but in all cases, the exosome fraction was significantly more effective compared to the soluble fraction.

Example 4. Preparation and Characterization of Edu-MSC Exosomes

Next, the effect of exosomes, isolated from inflammation-primed MSCs, on the LPS-induced microglia activation was tested. The steps for the collection of exosomes from inflammation educated-MSCs (edu-MSC exo) are shown in FIG. 2A. First, HMC3 cells are challenged with LPS or AβOs as described in the methods. The conditioned media of LPS or AβO challenged microglia cells is collected and added to MSCs. Then the total secretome of proinflammatory-primed hMSCs is collected and the extracellular vehicle fraction is isolated as described in the methods. The particle size and concentration (number of nanoparticles/ml) was estimated by nanoparticle tracking analysis (NTA, NanoSight NS 300). The size and morphology of exosomes was also assessed by Transmission Electron Microscopy (TEM).

According to NTA, the average nanoparticle diameter was approximately 120 nm with a broad vesicle size distribution from 40 to 350 nm (FIG. 2B) and the size was also confirmed by TEM (FIG. 2C). The nanoparticle concentration was also estimated based on the CD63 marker, using ExoElisa complete kit (amsbio) as described in manufacturer's instructions. For all in vitro experiments a dose of $2 \times 10^9$ exosomes/ml was used.

Figure 4A:
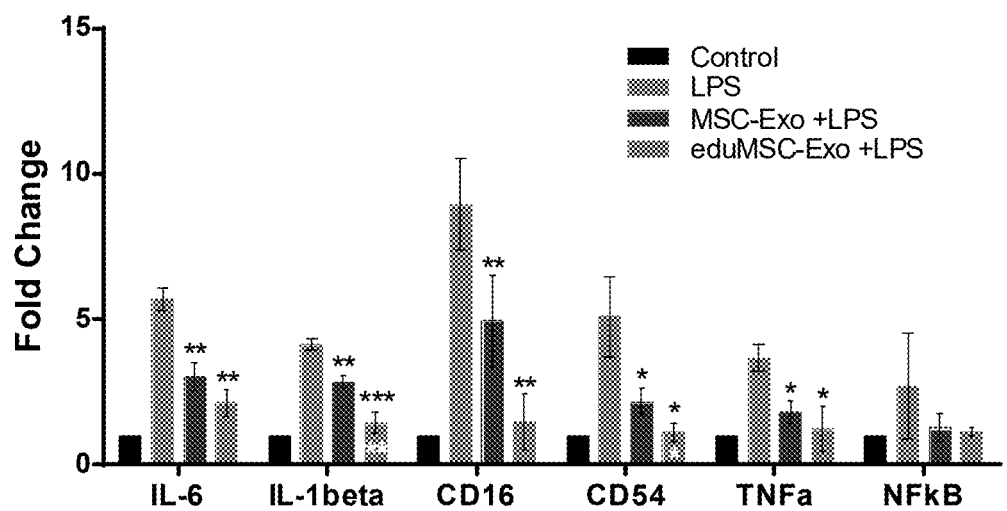
FIGS. 4A-4C show effect of MSC exosomes and edu-MSC exosomes on LPS-induced microglia activation.
Figure 4B:
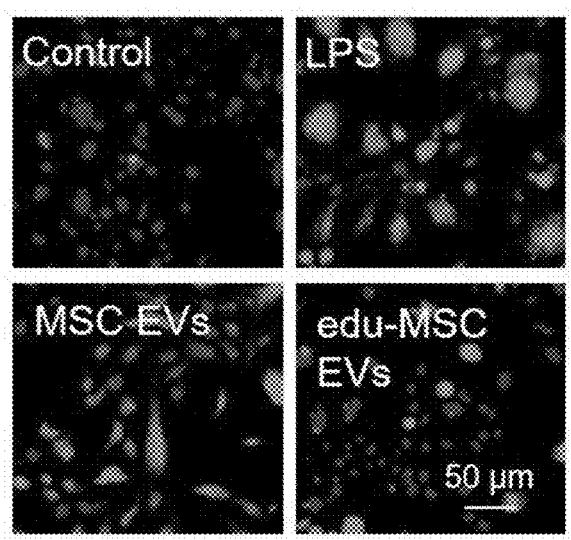
Figure 4C:
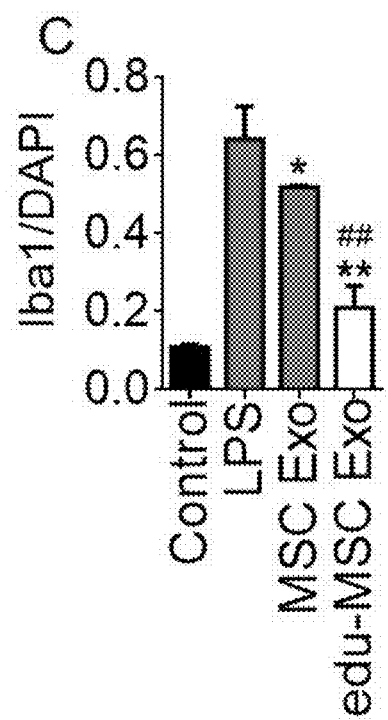

Example 5. Effect of MSC Exosomes and Edu-MSC Exosomes on LPS-Induced Human Microglia Activation The next experiment tested whether priming of MSCs with conditioned media of LPS-activated microglia cells results in the release of MSC-derived exosomes with enhanced immunomodulatory function, able to inhibit microglia activation. To test this, MSC exosomes and educated MSC exosomes were isolated, and their effect on LPS challenged microglia cells was tested. Gene expression analysis of IL-6, IL-1β, CD-16, CD-54, PPAR-g, TNF-a and NF-kB by qRT-PCR showed that edu-MSCexo were more effective in reversing the effect of LPS on microglia cells compared to MSCexo (FIG. 4A). Also, the gene expression of the intercellular adhesion molecule1 (ICAM-1 or CD-54), which is known to be involved in inflammatory processes in brain diseases, showed that the levels of ICAM-1 mRNA on LPS-challenged microglia were significantly lower in the case that the cells were also treated with either MSC exo or edu-MSC exo. More importantly, the difference between the effect of exo MSC and the edu-MSc exo on ICAM-1/CD-54 gene expression levels was significant with the edu-MSC exo being more effective. Furthermore, immunocytochemistry analysis using Iba-1 revealed that edu-MSC exo significantly suppressed microglia activation compared to MSC exosomes (FIG. 4B).

Figures 5A, 5B, 5C, 5D, 5E, 5F:
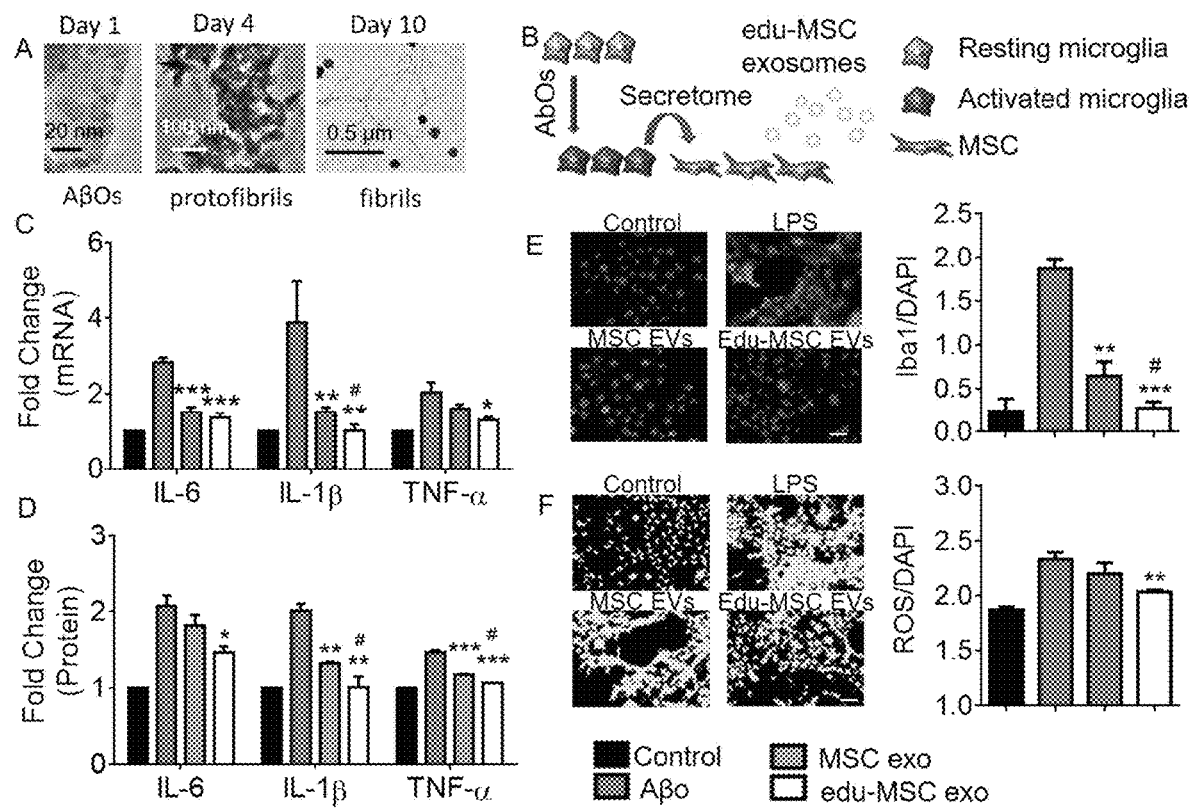
FIGS. 5A-5F show effect of MSC exosomes and edu-MSC exosomes on ABO-induced human microglia activation.

Example 6. Effect of MSC Exosomes and Edu-MSC Exosomes on AβO-Induced Human Microglia Activation In AD, neuronal cell death is associated with the presence of soluble Abeta oligomers (sAβOs) that trigger M1-microglia polarization. There is increasing evidence of the involvement of TLRs, especially TLR4 in neurodegeneration related to Alzheimer's disease. It has been shown that beta amyloid oligomers and fibrils stimulate differential activation of primary microglia. Also, it is known that Aβ oligomers is the most neurotoxic form and the one that sets fire to inflammation and induce Alzheimer's pathology through microglia activation by promoting TLR4-dependent glial cell activation. Based on that and given that LPS activates microglia cells through TLR4 activation pathway, whether priming of MSCs with AβO-activated microglia secretome also results in the secretion of exosomes with enhanced anti-inflammatory properties was tested. Aβ1-42 synthetic peptide was used for the formation of AβOs as described in methods. As seen in FIG. 5A, oligomers were successfully formed and used to activate microglia cells for 4 days. It is important to mention that the formation of protofibrils was observed on day 4 and the peptide finally formed fibrils on day 10. Then, MSC cells were primed with the total secretome of AβO-activated microglia for three days and edu-MSC exosomes were isolated and tested. Gene expression analysis of IL-6, IL-1β and TNF-α showed that edu-MSC exosomes were more effective in reversing the AβO-induced expression of proinflammatory genes on microglia cells compared to MSC exosomes (FIG. 5C). The expression of IL-6, IL-1β and TNF-α was also tested using human inflammation antibody array. The results further confirmed the lower expression of the proinflammatory cytokines in the case that AβO-challenged HMC3 cells are treated with edu-MSC exosomes (FIG. 5E). Furthermore, immunocytochemistry analysis using Iba-1 revealed significantly decreased microglia activation when AβO-challenged cells are treated with edu-MSC exosomes, compared to MSC exosomes, as it is indicated by the lower signal of Iba1 intensity as well as from the morphology of HMC3 cells. TLR-4 activation plays also a key role in reactive oxygen species production and release. As seen in FIG. 5F, AβO-treated microglia cells show increased levels of ROS but treatment of cells with edu-MSC exosomes significantly decreased ROS levels.

Example 7. Exosome Biodistribution after Intranasal Administration

Figures 6A, 6B, 6C:
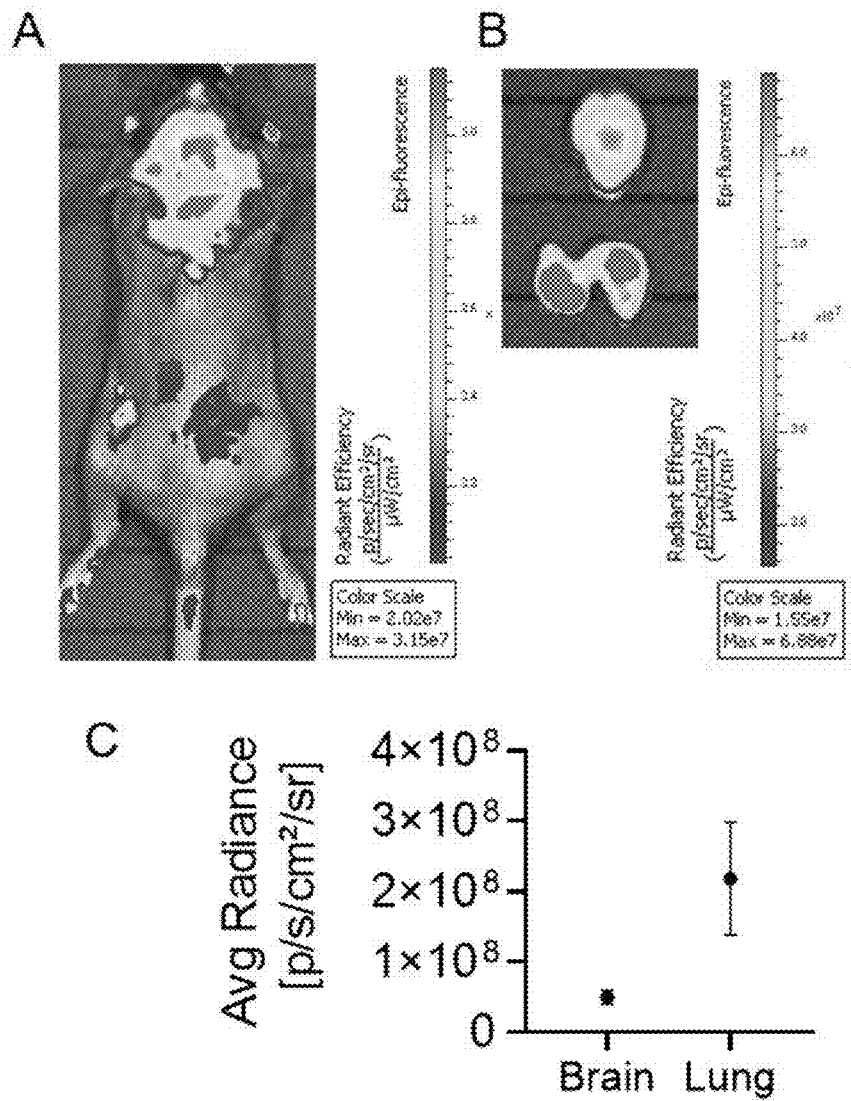
FIGS. 6A-6C show exosome biodistribution after intranasal administration.

Another obstacle to the successful neuroinflammation-related diseases treatments is the presence of the BBB. The biodistribution of DiR-labelled exosomes, after intranasal administration was tested and as is seen in FIG. 6A, the exosomes are mainly accumulated to the brain and lungs one-hour post-administration. The high accumulation to the brain and lungs is also confirmed by ex vivo imaging of the organs (FIG. 6B). The results show that the DiR brain signal is almost four times lower compared to that of the lung signal, one-hour post-administration (FIG. 6C) which further confirms the successful accumulation of the exosomes to the brain.

Figures 7A, 7B:
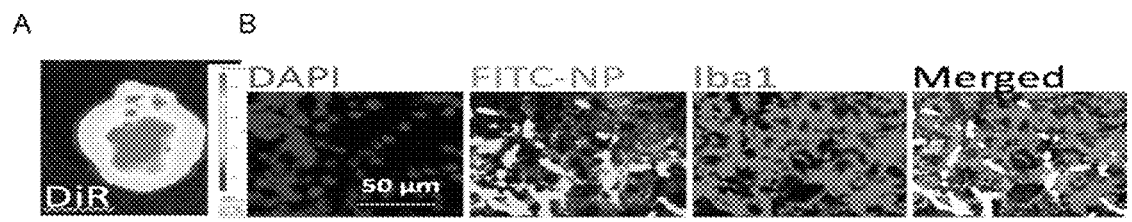
FIGS. 7A and 7B show localization of MSCexo to the brain.

Example 8. Inhibitory Effect of MSC Exo and Edu-MSC Exo on LPS-Induced Astrocytosis and Microgliosis In Vivo Next, an assessment was done to test whether MSCexo are able to pass through the blood brain barrier (BBB) and reach the activated microglia after intranasal administration, using an LPS-induced mouse neuroinflammation model. The mice were injected intraperitoneally with LPS at a dose of 250 μg/kg for 7 consecutive days and with a dose of 1 mg/kg for three more days. At day 10, the mice were administered intranasal DiR or FITC-labeled exosomes and sacrificed 2 hours post-administration. The explanted organs of mice administered DiR-labeled exosomes were imaged using IVIS. Immunohistochemistry using Iba1 was performed on brain sections of the mice administered FITC-labeled exosomes. The data indicated that the labeled exosomes can effectively cross the BBB in vivo (FIG. 7A) and reach the activated microglia cells (FIG. 7B). Colocalization analysis for FITC and Iba1 revealed that the Pearson's correlation coefficient was 0.34 which further confirms the ability of exosomes to reach activated microglia.

Next examined was whether MSC exosomes and edu-MSC exosomes can inhibit LPS-induced activation in astrocytes and microglia in vivo, using the LPS-induced inflammation mouse model, the same mouse model described above. It has been shown that LPS infiltrates in the brain in physiological conditions through a lipoprotein transport mechanism, and it is bound to its receptors in blood-brain interfaces. Also, in recent years, some neurological diseases, such as Alzheimer's disease, have been related to the increase of plasma LPS levels caused by leaky gut syndrome. In these experiments, mice were administered LPS intraperitoneally at a dose of 250 μg/kg for 7 consecutive days. Then, mice were administered PBS, MSC exosomes or edu-MSC exosomes intranasal at a dose of 20×10$^9$ particles per mouse for three days. On days 8, 9 and 10 the mice were administered a higher LPS dose of 1 mg/kg. On day 11, mice were sacrificed, and their brains were analyzed by immunohistochemistry using Iba-1 for microglia, and anti-Glial Fibrillary Acidic Protein (GFAP) for astrocytes.

Figure 8:
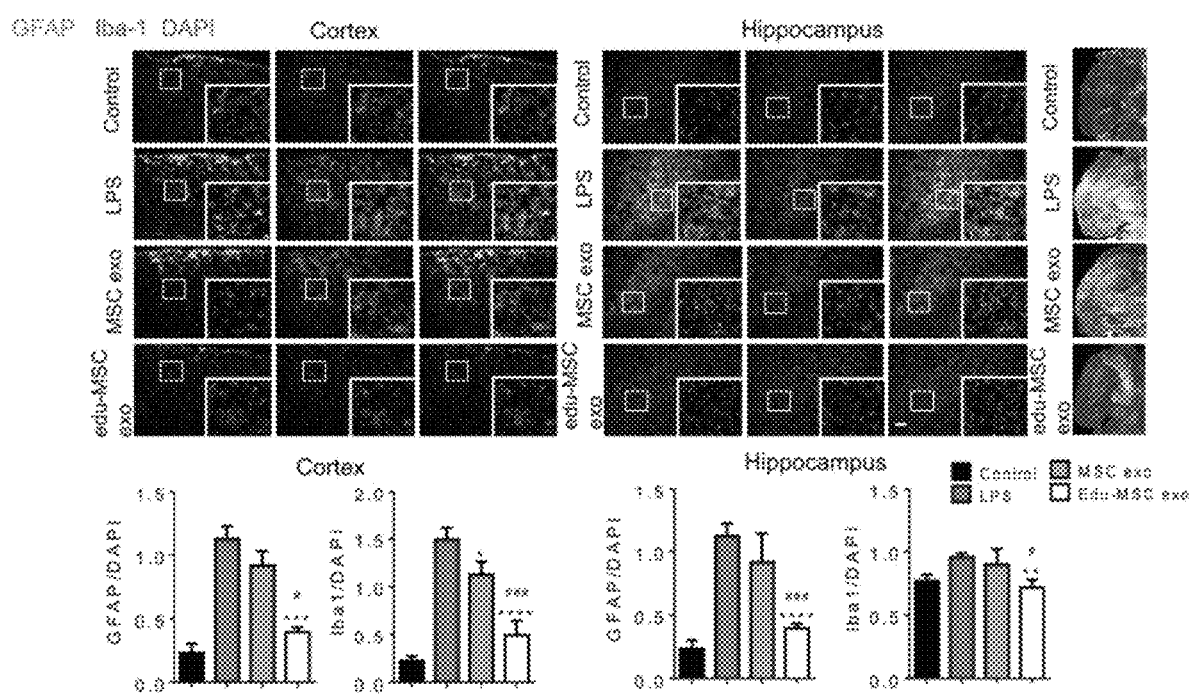
FIG. 8 shows inhibitory effect of MSCexo and edu-MSCexo on LPS-induced astrocytosis (GFAP) and microgliosis (IBA1). Representative images of GFAP and Iba1 staining for cortex (left) hippocampus (right) and quantitative analysis using imageJ (down). (n=10) *P<0.05; P<0.01; *P<0.001; ****P<0.000; #P<0.05; ###P<0.0001 one-way ANOVA, data are mean±SEM. * corresponds to significant differences with LPS group, # corresponds to significant differences MSC-exo group.

As seen in FIG. 8, LPS treatment induced astrocyte activation, which is indicated by the increased intensity of GFAP immunoreactivity. Microglia cells of LPS group, also displayed a more amoeboid morphology, enlarged cell body and strong Iba1 intensity in the cortex and hippocampus of the brain. Astrocytes in the brains of mice injected with edu-MSC exo showed minimal activation with significantly lower GFAP signal in comparison with MSC exosome group. Also, microglia in the cortex and hippocampus of the brains of mice administered edu-MSC exosomes, displayed more normal ramified morphology with light staining in comparison with MSC exosome treated groups.

Figures 9A, 9B, 9C:
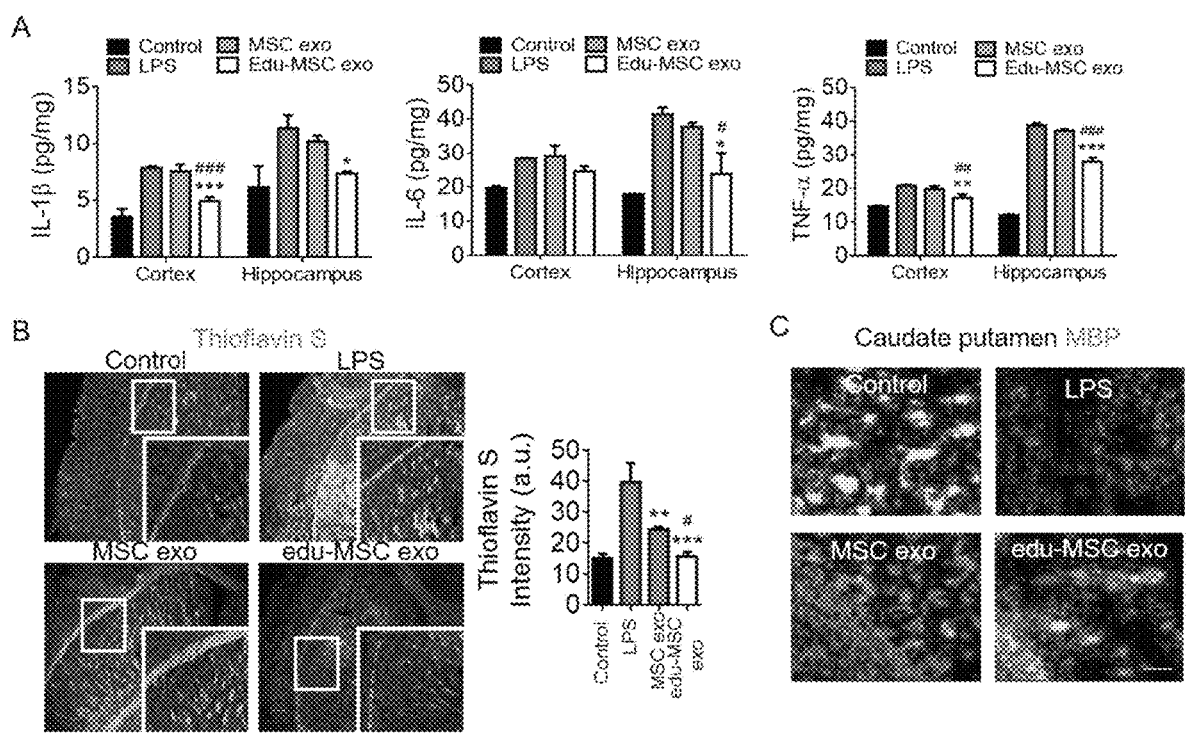
FIGS. 9A-9C show edu-MSC exosome treatment inhibits LPS-induced expression of cytokines, beta amyloid deposition and demyelination.

Example 9. Edu-MSC Exosome Treatment Inhibits LPS-Induced Expression of Cytokines, Beta Amyloid Deposition and Demyelination The activation of microglia and astrocytes by LPS, through the key innate immune receptor TLR4, leads to the production of proinflammatory cytokines that contribute to neuronal cell death. For this reason, the levels of proinflammatory cytokines IL-6, IL-1β and TNF-α in the cortex and hippocampus of the mice were also tested using Elisa. As seen in FIG. 9A, LPS treatment results in the increased expression of IL-6, IL-1b and TNF-α. Treatment of mice with MSC exosomes slightly decreased the expression of cytokines but not significantly while edu-MSC exo treatment significantly decreased the IL-6, IL-1β and TNF-α levels in both the cortex and the hippocampus.

It is known that neuroinflammation plays a key role in Alzheimer's disease (AD) pathogenesis. Also, it has been shown that systemic inflammation generated by LPS leads to amyloidogenesis and deposition of amyloids which form amyloid plaques. Herein using the LPS-induced inflammation model described above showed that LPS administration led to formation of amyloid plaques mainly in the cerebral cortex and hippocampus as it is indicated by the thioflavin S staining of amyloid plaques (FIG. 9A). Mice administered MSC exosomes showed significantly less amyloid deposition compared to non-treated mice. More importantly, edu-MSC exosomes are significantly more effective in inhibiting amyloid deposition, compared to MSC exosomes, as it is indicated by the lower Thioflavin S signal (FIG. 9B). It has also been shown that the LPS-induced increase in amyloid beta results in demyelination and oligodendrocyte injury in mice brains, which in turn causes sporadic Alzheimer's disease. Myelin Basic Protein staining revealed visible loss of myelin in the caudate-putamen region of the LPS group and signs of remyelination on the MSC exo and edu-MSC exo groups (FIG. 9C).

Figures 10A, 10B, 10C, 10D:
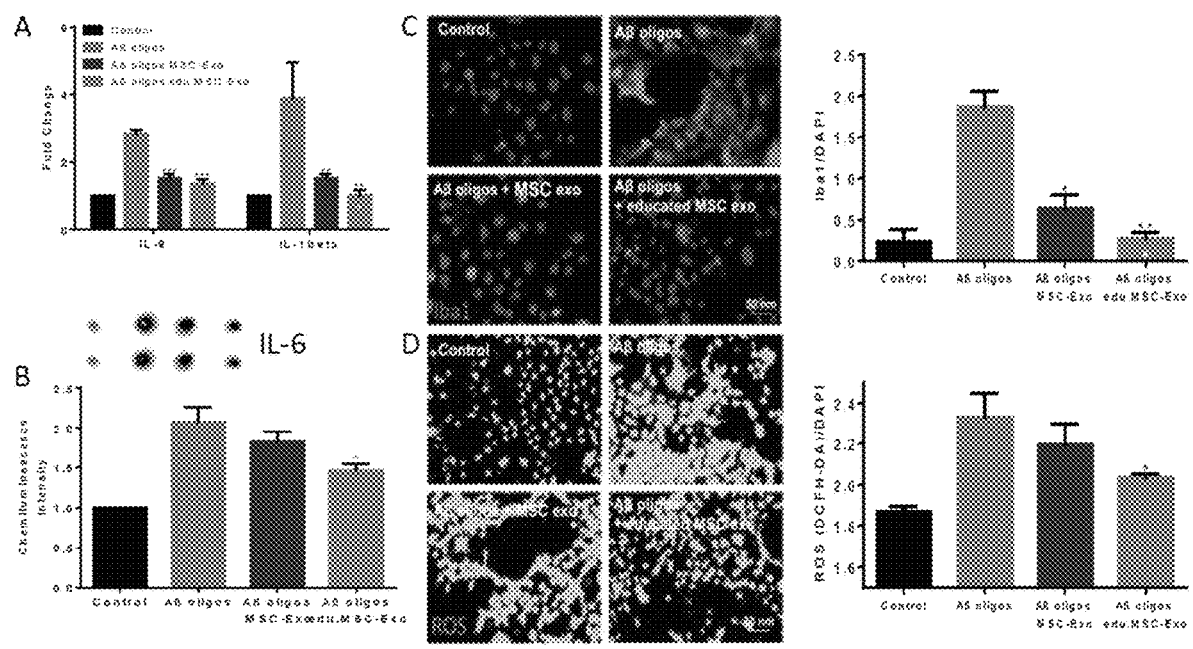
FIGS. 10A to 10D show the effect of MSCexo and ADeduMSC-exo on AβO-challenged microglia cells.

The data shown herein provides that exosomes isolated from stem cells exposed to AD related inflammatory conditions can effectively fight AD-associated neuron death. On this direction, Abeta (1-42) peptide was self-assembled into sAβOs. The same 3-step preparation described above (FIG. 2) was used to isolate educated AD-inflammatory exosomes (ADedu-MSCexo). In order to test if the ADedu-MSCexo can inhibit the activation of microglia cells by sAβOs, the same set of experiments were conducted using AβOs to challenge microglia cells. The qRT-PCR and dot blot ELISA results revealed that ADedu-MSCexo are more effective compared to MSCexo in inhibiting the sAβOs-induced activation of microglia cells. This is indicated by the decreased IL-1β gene expression (FIG. 10A) and IL-6 release (FIG. 10B). In addition, the ROS production (DCFH-DA assay) and the Nitrite release (Griess reaction), both products of the sAβO-induced microglia activation, were significantly decreased in the case that the sAβO-challenged microglia cells were treated with ADedu-MSCexo instead of MSCexo (FIGS. 10C and 10E). Microglia cells in the brain of mice administered ADedu-MSCexo had ramified morphology with significantly lower Iba1 signal compared to that of mice administered MSCexo. Furthermore, as described above, ADedu-MSCexo are loaded with ATRA in order to block further production of sAβOs. These data reveal that the ATRA post-isolation loading capacity of exosomes is 240 μg for 20×10$^9$ particles. This is high considering that a dose of 20 mg/kg of ATRA administered 3 times to Alzheimer's disease (AD) transgenic mice was able to rescue memory loss.

Figures 11A, 11B, 11C:
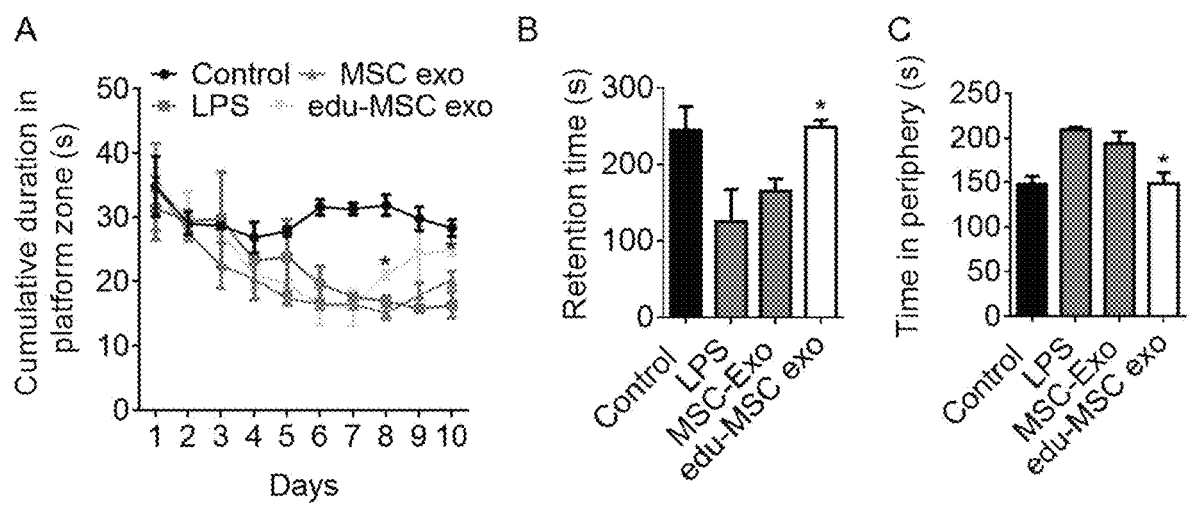
FIGS. 11A-11C show effect of MSC exosomes and edu-MSC exosomes on the memory, motor activity and anxiety-like behavior. Performance of mice on Morris water maze (FIG. 11A), rotarod (FIG. 11B), and Open Field behavior tests (FIG. 11C). (n=5). *P<0.05 one-way ANOVA, data are mean±SEM.

Example 10. Effect of MSC Exosomes and Edu-MSC Exosomes on the Memory, Motor Activity and Anxiety-Like Behavior To elucidate the effect of the MSC exosomes and edu-MSC exosomes on the LPS-induced cognitive impairment, memory, learning, motor activity and anxiety-like behavior, MWM test, rotarod and open field were conducted. In the MWM test, the mice were trained, over the course of a 7-day training trial, to find a platform. As seen in FIG. 11A, the LPS group spent less time in the platform zone compared to the control group demonstrating that a memory deficiency is induced by LPS. edu-MSC treated group spent more time on the platform quadrant than the LPS group on day 9 and 10 but this difference was not significant. The results also showed that edu-MSC exo group spent significantly more time in the quadrant of the platform compared to the LPS group on day 8 and 10 of the test indicating that edu-MSC treatment can partially reverse the memory deficiency caused by LPS. To test the motor coordination, mice were tested for their performance in rotarod test. FIG. 11B shows that LPS treatment results in shorter retention time compared to the control group. Also, the results show the edu-MSC exo treatment significantly increased the retention time and reversed the LPS-induced motor incoordination. In OF, LPS treatment elicit anxiety-like responses as it is indicated by the significantly increased time the LPS group spent in the periphery. Following edu-MSC exosome treatment the time spent in the periphery was reduced to the level of the control mice.

Example 11. Identification of Differentially Expressed miRNAs and the Gene Pathways Of Upregulated miRNAs Targets To investigate what makes edu-MSC exosomes more effective than MSC exosomes in reversing the effect of LPS, the differential expression of miRNAs between MSC exosomes and edu-MSC exosomes was examined. Total RNA was isolated from each sample and 500 ng RNA was sent to Array Star for miRNA sequencing analysis. The Scatter-Plot (FIG. 12A), which was plotted using log 2scaled CPM values, shows that 388 miRNAs are upregulated in edu-MSC EVs compared to MSC-Evs, 278 are downregulated while the expression of 238 miRNAs remains the same between the two groups. Differences in miRNA patterns were also visualized in a hierarchical clustering plot (heatmap FIG. 12B) performed using significant differentially expressed miRNAs with a fold change higher than 1.5. Among these miRNAs there were 19 miRNAs with an expression fold change higher than 100 between the two groups.

To investigate the targets of the top overexpressed miRNAs, miRNA databases was used to search for potential miRNA-targeted genes. After the identification of the miRNA targeted genes, they were mapped to KEGG pathways. Pathways analysis revealed that 4 miRNAs, among the top 10 overexpressed miRNAs, target 5 critical genes in the Toll Like Receptor 4 signaling pathway. More specifically, the hsa-miRNA-10527-5p targets the TRAF, MAPK8, MAPK1 and MAP2K1 genes with target scores 79, 75, 96 and 92 respectively. The analysis also revealed that MAPK8 is also a potential target of hsa-miRNA-219a-2-3 and hsa-miR-329-5p. hsa-miRNA-219a-2-3, which is the most overexpressed miRNA with an expression fold change of 1800 between the MSC exosomes and edu-MSC exosomes, targets MAP2K7. The same gene is also targeted by hsa-miRNA-10527-5p and hsa-miR-329-5p, both upregulated in the edu-MSC exo cargo with a fold change 400 and 300, respectively. Furthermore, GO enrichment analysis was used to investigate what biological processes are associated with the top overexpressed miRNAs. The functional trend analysis of predicted miRNA targets indicates that the top upregulated miRNAs play a role in neurogenesis and generation of neurons with p values of 0,000164455 and 0,00017451 respectively (FIG. 12D).

Figures 12A, 12B, 12C, 12D, 12E:
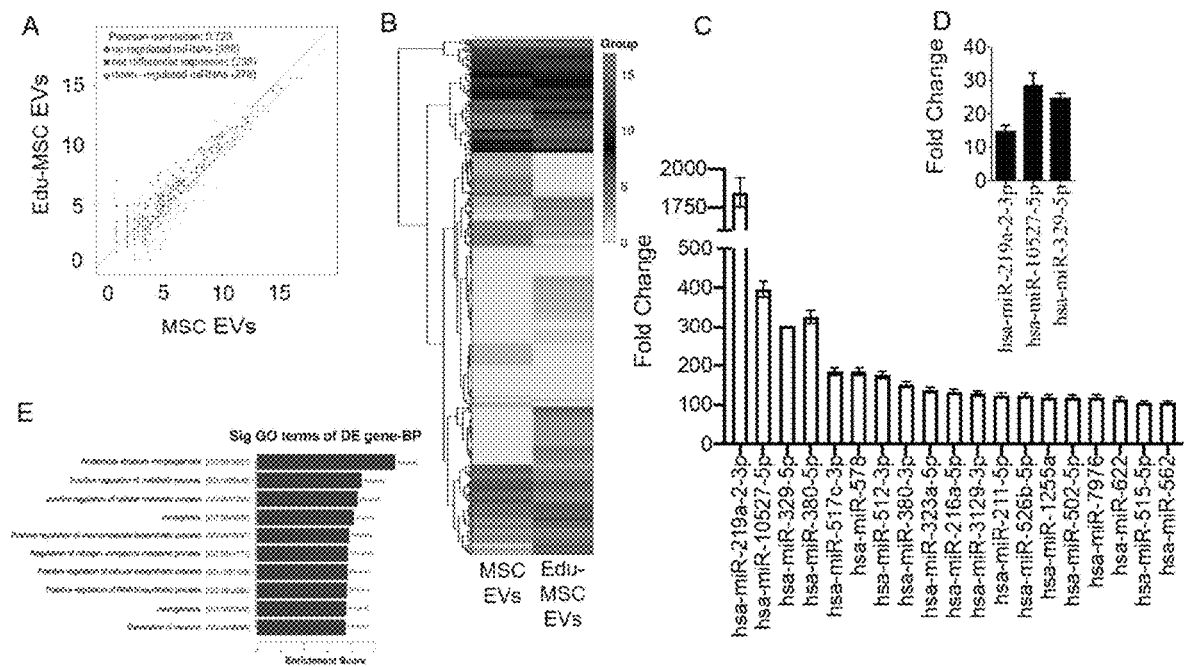
FIGS. 12A-12E show identification of top differentially expressed miRNAs.
Figures 13A, 13B:
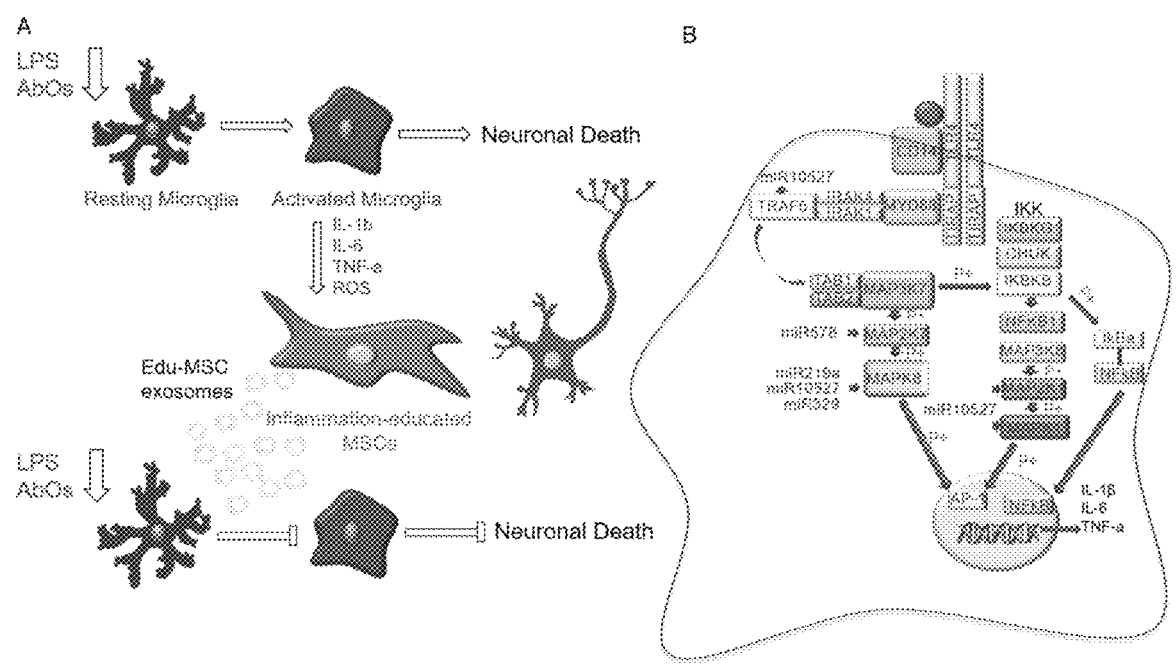
FIG. 13A shows that MSC cells primed with the secretome of LPS or ABO-activated microglia cells release exosomes with anti-inflammatory properties able to block LPS or ABO-induced microglia activation.
FIG. 13B shows the role of the overexpressed miRNAs of exosomes derived from Inflammation-educated MSCs in the downregulation of key genes involved in the TLR4 signaling pathway.

The miRNA sequencing analysis for the MSC exosomes and ABO edu-MSC exosomes showed that the miRNA-219a-2-3, miRNA-10527-5p and the hsa-miR-329-5p are also upregulated with a fold change of 15, 30 and 25, respectively (FIG. 12E).

The majority of chronic inflammation-related diseases progress due to improper resolution of the initial pro-inflammatory response. MSC transplantation approaches have shown promising results in treating neurodegenerative diseases however these approaches are limited due to the low percent of MSCs survival in vivo after transplantation. MSC can sense the inflammatory milieu and respond to that to in an attempt to regain homeostasis. Thus, understanding the mechanisms of crosstalk between the stem cells and the inflammatory milieu is of great importance for the development of new therapies. Recent studies have shown that preconditioning of MSCs with LPS is an effective therapeutic approach for the treatment of inflammatory-based diseases. Previous study has shown that inflammatory conditions affect gene expression and function of human adipose tissue-derived mesenchymal stem cells. Also, MCP-1 priming of stem cells improves their therapeutic effects on contact hypersensitivity and hypoxia preconditioning of MSCs potentiate their immunotherapeutic function. Furthermore, it has been shown that exosomes of LPS preconditioned MSCs are effective in enhancing diabetic cutaneous wound healing. Herein, an alternative approach was used to prime MSCs, and the effect primed-MSC derived exosomes was tested in reversing neuroinflammation. This approach is also based on MSC's ability to sense and respond to the milieu by boosting the expression of several miRNAs that can maintain homeostasis and by limiting inflammation and inflammation-inflicted tissue damage. In most neurodegenerative diseases microglia cells are the ones that first sense and respond to pathogens and misfolded proteins which results to their conversion to M1 and the subsequent release of cytokines that cause neuroinflammation and neuronal death. Based on that, microglia was first activated using two different TLR4 agonists, LPS or Abeta oligomers, and then MSCs were primed with the secretome of activated microglia cells (educated-MSCs). The present study showed that exosomes isolated from educated-MSC, were more effective in inhibiting microglia activation compared to those isolated from non-educated MSCs. Also, in vivo, edu-MSC exosomes not only inhibit both microglia and astrocyte activation more effectively than MSC exosomes but also hindered the abeta deposition and neuronal demyelination. It has been shown that the deposition of amyloid plaques to the brain of LPS-induced neuroinflammation mice is associated to high levels of IL-1b, IL-6 and TNFa. LPS and Abeta oligomers are both agonists for the TLR4/CD14 receptor, and the presence of both agonists sets up a vicious cycle where LPS acts on the TLR4/CD14 receptor which increases Aβ which in turn provides positive feedback on the TLR4/CD14 receptor that leads to the progression of AD pathology. LPS-induced neuroinflammation has been shown to contribute to neurodegenerative diseases and cognitive and motor dysfunction. Behavior tests showed that edu-MSC exosomes inhibit the LPS-induced cognitive and motor impairment and anxiety-like behavior more efficiently than MSC exosomes.

To understand the mechanism underlying the effect of edu-MSC exosomes, the study focused on their differential miRNA expression between the MSC exosomes and the edu-MSC exosomes. It is known that the MSC-microglia cross talk is mediated by exosomes and that MSC can dynamically adjust the exosomal regulatory cargo. Also, it is known that miRNAs are the most well described non-coding RNAs of exosomes and that's what drove the research towards analyzing the differential expressed miRNAs between the MSC exosomes and edu-MSC exosomes. The 19 top overexpressed miRNAs were first identified with an overexpression fold change higher than 100. Then miRNA-targeted genes was identified using the miRNA databases. The targeted genes were identified and mapped to KEGG pathways to infer functional consequences of the deregulation of these miRNAs. Among the top overexpressed miRNAs, miRNA-219a-2-3, miR-10527, miR-329, miR-578 with an expression fold change of 1800, 400, 300 and 200, respectively target genes with key roles on TLR pathway. Upon LPS or ABO binding to TLR4/CD14, MyD88-dependent pathway recruits IRAKs and that triggers the formation of a complex that also contains TRAF6. Then, TRAF6 recruits the downstream kinases MAP3K7 and IKK that activate their downstream NF-κB and MAPK pathways that result in the expression of pro-inflammatory cytokines. The analysis revealed that miR-10527 potentially targets 4 genes involved mainly in the protein kinase signaling in inflammation. The first miR-10527 target, downstream of TLR4, is Tumor Necrosis Associated factor 6 (TFAR6). TRAF6 is a mediator of NF-κB and MAPK pathway activation that both result in the release in proinflammatory cytokines. It has been shown recently that downregulation or blockade of TRAF significantly reduced cytokines expression in LPS-induced inflammation. Three more miR-10527 targeted genes are the Mitogen-Activated Protein Kinase 1 (MAPK8), Mitogen-Activated Protein Kinase 1 (MAP2K1 also known as MEK1/2) and Mitogen-Activated Protein Kinase 1 (MAPK1 known also as ERK) with target scores 75, 92 and 96, respectively. MEK1/2 is the immediate upstream kinases that phosphorylate and activate ERK that further regulates AP-1 activity and cytokine production. There is evidence that the MEK/ERK pathway represents a valid therapeutic target in neuroinflammation-related neurological disorders such as AD. It has also been shown recently that inhibition of MEK/ERK pathway reduces proinflammatory cytokines expression in cerebral ischemia. The analysis also shows that MAPK8 (also known as JNK1) which mediate proinflammatory actions of microglia is directly targeted by the other three upregulated miRNAs, miRNA-219a-2-3, miR-10527 and miR-329. MAPK8 is not only involved in cytokine production and release downstream TLR4 but several studies have shown that are involved in neuronal degeneration and MAPK8 inhibition leads to neurogenesis.

The analysis revealed one more target of the top overexpressed miRNAs, miR-578 targets MAP2K7 which is involved in signal transduction mediating the cell responses to proinflammatory cytokines, and environmental stresses. This kinase specifically phosphorylates MAPK8 which leads to AP-1 phosphorylation and cytokine production.

The functional trend analysis of predicted miRNA targets also shows that top upregulated miRNAs play a role in neurogenesis and generation of neurons. Previous studies indicate that the highly conserved brain miRNA miR-219 is downregulated in brain tissue taken at autopsy from patients with Alzheimer's disease (AD) and that lead to neurodegeneration. New findings also show that miRNA-219 is involved in oligodendrocyte maturation and can regulate myelination program in humans.

In summary, these results show that priming of MSC in AβO oligomes/LPS activated microglia microenvironment leads to the secretion of exosomes with enhanced anti-inflammatory capabilities. The eduMSC exosomes can reverse microglia activation in vitro and in vivo. In vivo these eduMSC exosomes inhibit astrocyte and microglia activation as well as amyloid deposition and demyelination. The analysis of the exosome miRNA cargo revealed that several miRNAs were deregulated in edu MSC exosomes. The targeted genes were identified and a potential mechanism for their function is suggested. Further validation in AD mouse model or other neuroinflammation related disorders and behavioral studies would be valuable.

Sequences
SEQ ID NO: 1 (amino acid sequence of beta-amyloid protein 1-42)
DAEFRHDSGYEVHHQKLVFFAEDVGSNK-GAIIGLMVGGVVIA
SEQ ID NO: 2 (NFκB FwPr)
5'-GCA GAT GGC CCA TAC CTT CA-3'
SEQ ID NO: 3 (NFκB RvPr)
5'-CAC CAT GTC CTT GGG TCC AG-3'
SEQ ID NO: 4 (CD16 FwPr)
5'-ATG TGT CTT CAG AGA CTG TGA AC-3'
SEQ ID NO: 5 (CD16 RvPr)
5'-TTT ATG GTC CTT CCA GTC TCT TG-3'
SEQ ID NO: 6 (CD54 FwPr)
5'-ACA CTA GGC CAC GCA TCT G-3'
SEQ ID NO: 7 (CD54 RvPr)
5'-TCA TGG TGG GGC TAT GTC TC-3'
SEQ ID NO: 8 (TNFα FwPr)
5'-TGT AGC CCA TGT TGT AGC AAA-3'
SEQ ID NO: 9 (TNFα RvPr)
5'-TTG AAG AGG ACC TGG GAG TAG A-3'
SEQ ID NO: 10 (IL 10 FwPr)
5'-GGG AGA ACC TGA AGA CCC TC-3'
SEQ ID NO: 11 (IL 10 RvPr)
5'-ATA GAG TCG CCA CCC TGA AGA CCC TC-3'
SEQ ID NO: 12 (IL-1β FwPr)
5'-AGGAGCACTTCATCTGTTTAGG-3'
SEQ ID NO: 13 (IL-1β RvPr)
5'-GCCAATCTTCATTGCTCAAGTG-3'

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A method of treating neuroinflammation in a subject, comprising administering to the subject a therapeutically effective amount of exosomes isolated from bone-marrow-derived mesenchymal stem cells, wherein the bone-marrow-derived mesenchymal stem cells are cell is exposed to a conditioned media, and wherein the conditioned media is collected from microglial cells cultured in the presence of lipopolysaccharide (LPS) or a beta-amyloid oligomer for from about 6 hours to about 72 hours, thereby increasing production of at least one reactive oxygen species (ROS) or at least one proinflammatory cytokine in the microglial cells relative to control microglial cells, wherein the bone-marrow-derived mesenchymal stem cells are cell is selected from the group consisting of a primary human bone-marrow-derived mesenchymal stem cell and a bone-marrow-derived mesenchymal stem cell line, wherein the exosomes comprise a protein selected from the group consisting of CD81, CD9, and CD63, wherein the exosomes comprise one or more miRNAs, wherein levels of the one or more miRNAs in the exosomes are increased relative to exosomes isolated from a control mesenchymal stem cell, wherein the one or more miRNAs are selected from a group consisting of miR-219a-2-3, miR-10527, miR-329, miR-380, miR-517c, miR-578, miR-512, miR-380, miR-323a, miR-216a, miR-3129, miR-211, miR-526b, miR-1255a, miR-502, miR-7976, miR-622, miR-515, and miR-562.

2. The method of claim 1, wherein the exosomes further comprise retinoic acid.

3. The method of claim 1, wherein the one or more miRNAs are selected from the group consisting of miRNA-219a-2-3, miR-10527, miR-329, and miR-578.

4. The method of claim 1, wherein at least one proinflammatory cytokine comprises TNF-α, IL-6 or IL-1β.

5. The method of claim 1, wherein the subject has Alzheimer's disease.

\* \* \* \* \*

SEQUENCE LISTING

```
<160> NUMBER OF SEQ ID NOS: 13

<210> SEQ ID NO 1
<211> LENGTH: 42
<212> TYPE: PRT
<213> ORGANISM: Artificial Sequence
<220> FEATURE:
<223> OTHER INFORMATION: Synthetic construct

<400> SEQUENCE: 1

Asp Ala Glu Phe Arg His Asp Ser Gly Tyr Glu Val His His Gln Lys
1               5                   10                  15

Leu Val Phe Phe Ala Glu Asp Val Gly Ser Asn Lys Gly Ala Ile Ile
            20                  25                  30

Gly Leu Met Val Gly Gly Val Val Ile Ala
        35                  40

<210> SEQ ID NO 2
<211> LENGTH: 20
<212> TYPE: DNA
<213> ORGANISM: Artificial Sequence
<220> FEATURE:
```

<223> OTHER INFORMATION: Synthetic construct

<400> SEQUENCE: 2
gcagatggcc cataccttca                                           20

<210> SEQ ID NO 3
<211> LENGTH: 20
<212> TYPE: DNA
<213> ORGANISM: Artificial Sequence
<220> FEATURE:
<223> OTHER INFORMATION: Synthetic construct

<400> SEQUENCE: 3
caccatgtcc ttgggtccag                                           20

<210> SEQ ID NO 4
<211> LENGTH: 23
<212> TYPE: DNA
<213> ORGANISM: Artificial Sequence
<220> FEATURE:
<223> OTHER INFORMATION: Synthetic construct

<400> SEQUENCE: 4
atgtgtcttc agagactgtg aac                                       23

<210> SEQ ID NO 5
<211> LENGTH: 23
<212> TYPE: DNA
<213> ORGANISM: Artificial Sequence
<220> FEATURE:
<223> OTHER INFORMATION: Synthetic construct

<400> SEQUENCE: 5
tttatggtcc ttccagtctc ttg                                       23

<210> SEQ ID NO 6
<211> LENGTH: 19
<212> TYPE: DNA
<213> ORGANISM: Artificial Sequence
<220> FEATURE:
<223> OTHER INFORMATION: Synthetic construct

<400> SEQUENCE: 6
acactaggcc acgcatctg                                            19

<210> SEQ ID NO 7
<211> LENGTH: 20
<212> TYPE: DNA
<213> ORGANISM: Artificial Sequence
<220> FEATURE:
<223> OTHER INFORMATION: Synthetic construct

<400> SEQUENCE: 7
tcatggtggg gctatgtctc                                           20

<210> SEQ ID NO 8
<211> LENGTH: 21
<212> TYPE: DNA
<213> ORGANISM: Artificial Sequence
<220> FEATURE:
<223> OTHER INFORMATION: Synthetic construct

<400> SEQUENCE: 8
tgtagcccat gttgtagcaa a                                         21

```
<210> SEQ ID NO 9
<211> LENGTH: 22
<212> TYPE: DNA
<213> ORGANISM: Artificial Sequence
<220> FEATURE:
<223> OTHER INFORMATION: Synthetic construct

<400> SEQUENCE: 9
ttgaagagga cctgggagta ga                                              22

<210> SEQ ID NO 10
<211> LENGTH: 20
<212> TYPE: DNA
<213> ORGANISM: Artificial Sequence
<220> FEATURE:
<223> OTHER INFORMATION: Synthetic construct

<400> SEQUENCE: 10
gggagaacct gaagaccctc                                                 20

<210> SEQ ID NO 11
<211> LENGTH: 26
<212> TYPE: DNA
<213> ORGANISM: Artificial Sequence
<220> FEATURE:
<223> OTHER INFORMATION: Synthetic construct

<400> SEQUENCE: 11
atagagtcgc caccctgaag accctc                                          26

<210> SEQ ID NO 12
<211> LENGTH: 22
<212> TYPE: DNA
<213> ORGANISM: Artificial Sequence
<220> FEATURE:
<223> OTHER INFORMATION: Synthetic construct

<400> SEQUENCE: 12
aggagcactt catctgttta gg                                              22

<210> SEQ ID NO 13
<211> LENGTH: 22
<212> TYPE: DNA
<213> ORGANISM: Artificial Sequence
<220> FEATURE:
<223> OTHER INFORMATION: Synthetic construct

<400> SEQUENCE: 13
gccaatcttc attgctcaag tg                                              22
```